US012692627B2

(12) United States Patent
Rhee et al.

(10) Patent No.: US 12,692,627 B2
(45) Date of Patent: Jul. 28, 2026

(54) METHOD OF IDENTIFYING INTRACELLULAR SECRETORY PROTEIN OR TISSUE-SPECIFIC SECRETORY PROTEIN

(71) Applicants: SEOUL NATIONAL UNIVERSITY R&DB FOUNDATION, Seoul (KR); KOREA ADVANCED INSTITUTE OF SCIENCE AND TECHNOLOGY, Daejeon (KR)

(72) Inventors: Hyun Woo Rhee, Seoul (KR); Isaac Park, Incheon (KR); Jae Myoung Suh, Daejeon (KR); Kwang Eun Kim, Daejeon (KR)

(73) Assignees: SEOUL NATIONAL UNIVERSITY R&DB FOUNDATION, Seoul (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 1188 days.

(21) Appl. No.: 17/682,430

(22) Filed: Feb. 28, 2022

(65) Prior Publication Data

US 2022/0298513 A1 Sep. 22, 2022

(30) Foreign Application Priority Data

Mar. 17, 2021 (KR) ........................ 10-2021-0034941
Apr. 13, 2021 (KR) ........................ 10-2021-0047869

(51) Int. Cl.
*C40B 30/06* (2006.01)

(52) U.S. Cl.
CPC .................................... *C40B 30/06* (2013.01)

(58) Field of Classification Search
None
See application file for complete search history.

(56) References Cited

PUBLICATIONS

Jie Liu et al., "The secretome mouse provides a genetic platform to delineate tissue-specific in vivo secretion", PNAS, 2021, vol. 118, No. 3, pp. 1-8 (8 pages total).
Dae In Kim et al., "Filling the void: Proximity-based labeling of proteins in living cells", Trends Cell Biol., 2016, vol. 26, No. 11, pp. 804-817 (24 pages total).
Office Action issued Jan. 26, 2023 in Korean Application No. 10-2021-0034941.
Song-Yi Lee et al., "APEX Fingerprinting Reveals the Subcellular Localization of Proteins of Interest", Cell Reports, 2016, vol. 15, pp. 1837-1847 (12 pages total).
(Continued)

*Primary Examiner* — Christian C Boesen
(74) *Attorney, Agent, or Firm* — Sughrue Mion, PLLC

(57) ABSTRACT

The present invention relates to a method of identifying an intracellular secretory protein or tissue-specific secretory protein, by using a proximity labeling system. When the method according to the present invention is used, it is possible to clearly identify an intracellular secretory protein and to dynamically track the spatiotemporal dynamics of a secretory protein secreted from a specific tissue in a living subject such that it can be effectively utilized for the research on endocrine signals between tissues, and particularly, since it can be applied in situ, the scope of application can be further expanded. Therefore, the present invention can be applied to various disease models or tissues to discover new biomarkers and therapeutic target proteins associated with diseases.

12 Claims, 23 Drawing Sheets

Specification includes a Sequence Listing.

(56) References Cited

PUBLICATIONS

Kwang-Eun Kim et al., "Dynamic tracking and identification of tissue-specific secretory proteins in the circulation of live mice", Nature Communications, 2021, pp. 1-9, vol. 12, No. 5204.

Chulhwan Kwak et al., "Contact-ID, a tool for profiling organelle contact sites, reveals regulatory proteins of mitochondrial-associated membrane formation", PNAS, Jun. 2, 2020, pp. 12109-12120, vol. 117, No. 22.

SEQUENCE LISTING

```
<160> NUMBER OF SEQ ID NOS: 4

<210> SEQ ID NO 1
<211> LENGTH: 96
<212> TYPE: PRT
<213> ORGANISM: Artificial Sequence
<220> FEATURE:
<223> OTHER INFORMATION: SEC61b

<400> SEQUENCE: 1

Met Pro Gly Pro Thr Pro Ser Gly Thr Asn Val Gly Ser Ser Gly Arg
1               5                   10                  15

Ser Pro Ser Lys Ala Val Ala Ala Arg Ala Ala Gly Ser Thr Val Arg
            20                  25                  30

Gln Arg Lys Asn Ala Ser Cys Gly Thr Arg Ser Ala Gly Arg Thr Thr
        35                  40                  45

Ser Ala Gly Thr Gly Gly Met Trp Arg Phe Tyr Thr Glu Asp Ser Pro
    50                  55                  60

Gly Leu Lys Val Gly Pro Val Pro Val Leu Val Met Ser Leu Leu Phe
65                  70                  75                  80

Ile Ala Ser Val Phe Met Leu His Ile Trp Gly Lys Tyr Thr Arg Ser
                85                  90                  95


<210> SEQ ID NO 2
<211> LENGTH: 319
<212> TYPE: PRT
<213> ORGANISM: Artificial Sequence
<220> FEATURE:
<223> OTHER INFORMATION: TurboID

<400> SEQUENCE: 2

Lys Asp Asn Thr Val Pro Leu Lys Leu Ile Ala Leu Leu Ala Asn Gly
1               5                   10                  15

Glu Phe His Ser Gly Glu Gln Leu Gly Glu Thr Leu Gly Met Ser Arg
            20                  25                  30
```

```
Ala Ala Ile Asn Lys His Ile Gln Thr Leu Arg Asp Trp Gly Val Asp
        35                  40                  45

Val Phe Thr Val Pro Gly Lys Gly Tyr Ser Leu Pro Glu Pro Ile Pro
    50                  55                  60

Leu Leu Asn Ala Lys Gln Ile Leu Gly Gln Leu Asp Gly Gly Ser Val
65                  70                  75                  80

Ala Val Leu Pro Val Val Asp Ser Thr Asn Gln Tyr Leu Leu Asp Arg
                85                  90                  95

Ile Gly Glu Leu Lys Ser Gly Asp Ala Cys Ile Ala Glu Tyr Gln Gln
            100                 105                 110

Ala Gly Arg Gly Ser Arg Gly Arg Lys Trp Phe Ser Pro Phe Gly Ala
        115                 120                 125

Asn Leu Tyr Leu Ser Met Phe Trp Arg Leu Lys Arg Gly Pro Ala Ala
    130                 135                 140

Ile Gly Leu Gly Pro Val Ile Gly Ile Val Met Ala Glu Ala Leu Arg
145                 150                 155                 160

Lys Leu Gly Ala Asp Lys Val Arg Val Lys Trp Pro Asn Asp Leu Tyr
                165                 170                 175

Leu Gln Asp Arg Lys Leu Ala Gly Ile Leu Val Glu Leu Ala Gly Ile
            180                 185                 190

Thr Gly Asp Ala Ala Gln Ile Val Ile Gly Ala Gly Ile Asn Val Ala
        195                 200                 205

Met Arg Arg Val Glu Glu Ser Val Val Asn Gln Gly Trp Ile Thr Leu
    210                 215                 220

Gln Glu Ala Gly Ile Asn Leu Asp Arg Asn Thr Leu Ala Ala Thr Leu
225                 230                 235                 240

Ile Arg Glu Leu Arg Ala Ala Leu Glu Leu Phe Glu Gln Glu Gly Leu
                245                 250                 255

Ala Pro Tyr Leu Pro Arg Trp Glu Lys Leu Asp Asn Phe Ile Asn Arg
            260                 265                 270

Pro Val Lys Leu Ile Ile Gly Asp Lys Glu Ile Phe Gly Ile Ser Arg
        275                 280                 285

Gly Ile Asp Lys Gln Gly Ala Leu Leu Leu Glu Gln Asp Gly Val Ile
    290                 295                 300

Lys Pro Trp Met Gly Gly Glu Ile Ser Leu Arg Ser Ala Glu Lys
305                 310                 315
```

<210> SEQ ID NO 3
<211> LENGTH: 437
<212> TYPE: PRT
<213> ORGANISM: Artificial Sequence
<220> FEATURE:
<223> OTHER INFORMATION: SEC61b-TurboID

<400> SEQUENCE: 3

```
Met Pro Gly Pro Thr Pro Ser Gly Thr Asn Val Gly Ser Ser Gly Arg
1               5                   10                  15

Ser Pro Ser Lys Ala Val Ala Ala Arg Ala Ala Gly Ser Thr Val Arg
            20                  25                  30

Gln Arg Lys Asn Ala Ser Cys Gly Thr Arg Ser Ala Gly Arg Thr Thr
        35                  40                  45

Ser Ala Gly Thr Gly Gly Met Trp Arg Phe Tyr Thr Glu Asp Ser Pro
    50                  55                  60

Gly Leu Lys Val Gly Pro Val Pro Val Leu Val Met Ser Leu Leu Phe
65                  70                  75                  80
```

```
Ile Ala Ser Val Phe Met Leu His Ile Trp Gly Lys Tyr Thr Arg Ser
                85                  90                  95

Gly Ser Gly Thr Ile Asp Gly Lys Pro Ile Pro Asn Pro Leu Leu Gly
            100                 105                 110

Leu Asp Ser Thr Ala Ser Lys Asp Asn Thr Val Pro Leu Lys Leu Ile
        115                 120                 125

Ala Leu Leu Ala Asn Gly Glu Phe His Ser Gly Glu Gln Leu Gly Glu
    130                 135                 140

Thr Leu Gly Met Ser Arg Ala Ala Ile Asn Lys His Ile Gln Thr Leu
145                 150                 155                 160

Arg Asp Trp Gly Val Asp Val Phe Thr Val Pro Gly Lys Gly Tyr Ser
                165                 170                 175

Leu Pro Glu Pro Ile Pro Leu Leu Asn Ala Lys Gln Ile Leu Gly Gln
            180                 185                 190

Leu Asp Gly Gly Ser Val Ala Val Leu Pro Val Val Asp Ser Thr Asn
        195                 200                 205

Gln Tyr Leu Leu Asp Arg Ile Gly Glu Leu Lys Ser Gly Asp Ala Cys
    210                 215                 220

Ile Ala Glu Tyr Gln Gln Ala Gly Arg Gly Ser Arg Gly Arg Lys Trp
225                 230                 235                 240

Phe Ser Pro Phe Gly Ala Asn Leu Tyr Leu Ser Met Phe Trp Arg Leu
                245                 250                 255

Lys Arg Gly Pro Ala Ala Ile Gly Leu Gly Pro Val Ile Gly Ile Val
            260                 265                 270

Met Ala Glu Ala Leu Arg Lys Leu Gly Ala Asp Lys Val Arg Val Lys
        275                 280                 285

Trp Pro Asn Asp Leu Tyr Leu Gln Asp Arg Lys Leu Ala Gly Ile Leu
    290                 295                 300

Val Glu Leu Ala Gly Ile Thr Gly Asp Ala Ala Gln Ile Val Ile Gly
305                 310                 315                 320

Ala Gly Ile Asn Val Ala Met Arg Arg Val Glu Glu Ser Val Val Asn
                325                 330                 335

Gln Gly Trp Ile Thr Leu Gln Glu Ala Gly Ile Asn Leu Asp Arg Asn
            340                 345                 350

Thr Leu Ala Ala Thr Leu Ile Arg Glu Leu Arg Ala Ala Leu Glu Leu
        355                 360                 365

Phe Glu Gln Glu Gly Leu Ala Pro Tyr Leu Pro Arg Trp Glu Lys Leu
    370                 375                 380

Asp Asn Phe Ile Asn Arg Pro Val Lys Leu Ile Ile Gly Asp Lys Glu
385                 390                 395                 400

Ile Phe Gly Ile Ser Arg Gly Ile Asp Lys Gln Gly Ala Leu Leu Leu
                405                 410                 415

Glu Gln Asp Gly Val Ile Lys Pro Trp Met Gly Gly Glu Ile Ser Leu
            420                 425                 430

Arg Ser Ala Glu Lys
        435
```

<210> SEQ ID NO 4
<211> LENGTH: 365
<212> TYPE: PRT
<213> ORGANISM: Artificial Sequence
<220> FEATURE:
<223> OTHER INFORMATION: TurboID-KDEL

<400> SEQUENCE: 4

-continued

```
Met Glu Thr Asp Thr Leu Leu Leu Trp Val Leu Leu Leu Trp Val Pro
1               5                   10                  15

Gly Ser Thr Gly Asp Gly Ala Gln Pro Ala Arg Ser Lys Asp Asn Thr
            20                  25                  30

Val Pro Leu Lys Leu Ile Ala Leu Leu Ala Asn Gly Glu Phe His Ser
        35                  40                  45

Gly Glu Gln Leu Gly Glu Thr Leu Gly Met Ser Arg Ala Ala Ile Asn
    50                  55                  60

Lys His Ile Gln Thr Leu Arg Asp Trp Gly Val Asp Val Phe Thr Val
65                  70                  75                  80

Pro Gly Lys Gly Tyr Ser Leu Pro Glu Pro Ile Pro Leu Leu Asn Ala
                85                  90                  95

Lys Gln Ile Leu Gly Gln Leu Asp Gly Gly Ser Val Ala Val Leu Pro
            100                 105                 110

Val Val Asp Ser Thr Asn Gln Tyr Leu Leu Asp Arg Ile Gly Glu Leu
        115                 120                 125

Lys Ser Gly Asp Ala Cys Ile Ala Glu Tyr Gln Gln Ala Gly Arg Gly
    130                 135                 140

Ser Arg Gly Arg Lys Trp Phe Ser Pro Phe Gly Ala Asn Leu Tyr Leu
145                 150                 155                 160

Ser Met Phe Trp Arg Leu Lys Arg Gly Pro Ala Ala Ile Gly Leu Gly
                165                 170                 175

Pro Val Ile Gly Ile Val Met Ala Glu Ala Leu Arg Lys Leu Gly Ala
            180                 185                 190

Asp Lys Val Arg Val Lys Trp Pro Asn Asp Leu Tyr Leu Gln Asp Arg
        195                 200                 205

Lys Leu Ala Gly Ile Leu Val Glu Leu Ala Gly Ile Thr Gly Asp Ala
    210                 215                 220

Ala Gln Ile Val Ile Gly Ala Gly Ile Asn Val Ala Met Arg Arg Val
225                 230                 235                 240

Glu Glu Ser Val Val Asn Gln Gly Trp Ile Thr Leu Gln Glu Ala Gly
                245                 250                 255

Ile Asn Leu Asp Arg Asn Thr Leu Ala Ala Thr Leu Ile Arg Glu Leu
            260                 265                 270

Arg Ala Ala Leu Glu Leu Phe Glu Gln Glu Gly Leu Ala Pro Tyr Leu
        275                 280                 285

Pro Arg Trp Glu Lys Leu Asp Asn Phe Ile Asn Arg Pro Val Lys Leu
    290                 295                 300

Ile Ile Gly Asp Lys Glu Ile Phe Gly Ile Ser Arg Gly Ile Asp Lys
305                 310                 315                 320

Gln Gly Ala Leu Leu Leu Glu Gln Asp Gly Val Ile Lys Pro Trp Met
                325                 330                 335

Gly Gly Glu Ile Ser Leu Arg Ser Ala Glu Lys Gly Lys Pro Ile Pro
            340                 345                 350

Asn Pro Leu Leu Gly Leu Asp Ser Thr Lys Asp Glu Leu
        355                 360                 365
```

METHOD OF IDENTIFYING INTRACELLULAR SECRETORY PROTEIN OR TISSUE-SPECIFIC SECRETORY PROTEIN

GOVERNMENT SUPPORT

This application was supported by the National Research Foundation of Korea (NRF) funded by the Ministry of Science and ICT (Project No. 1711130492, 2021R1A2C2007573) and by the Korea Health Industry Development Institute (KHIDI) under the Dementia Research and Development Program funded by multiple ministries (Project No. 9991007689, HU20C0236).

CROSS-REFERENCE TO RELATED APPLICATIONS

This application is based on and claims priority under 35 U.S.C. § 119 to Korean Patent Application No. 10-2021-0034941, filed Mar. 17, 2021, and Korean Patent Application No. 10-2021-0047869 filed Apr. 13, 2021, in the Korean Intellectual Property Office, the disclosure of which is incorporated by reference herein its entirety.

TECHNICAL FIELD

The present invention relates to a method of identifying an intracellular secretory protein or tissue-specific secretory protein, by using a proximity labeling system.

BACKGROUND ART

Proximity labeling technology is a technique that selectively biotin-labels only proteins distributed in a specific space within living cells, and then easily separates the biotin-labeled proteins with Streptavidin beads and analyzes the same with a mass spectrometer, thereby easily obtaining the location information of proteins.

Two enzymes of BioID (biotin-labeled) and APEX2 (biotin phenoxy-labeled) are most widely used for proximity labeling technology, and in the case of TurboID which is the latest improved enzyme of BioID, it shows very advanced proximity labeling efficiency.

Meanwhile, secretory proteins secreted into the blood during the blood circulation process play an essential role in the physiological system and function as a key medium for communication between organs. Secretory proteins are mainly known as hormone-based signal transduction substances that transmit cell-to-cell or tissue-to-tissue signaling, and previously, studies on secretory proteins have been conducted by directly analyzing all proteins simply present in cell cultures or animal blood. Specifically, in previous studies, secretory proteins for each cell type were identified by analyzing the conditioned medium of an in vitro or ex vivo culture model, but in the case of such techniques, the complexity of a multi-organ system could not be fully reproduced, and thus, there was a disadvantage that the actual body environment was not sufficiently reflected. In addition, when a secretory protein was analyzed in the conventional way, it was not possible to distinguish which cell the analyzed protein was derived from, and in addition, there was a limitation in that it could not be distinguished if it was contaminated with cytoplasmic proteins bursting from dead cells rather than proteins secreted through the normal secretory pathway. As other approaches, bioinformatics tools such as Quantitative Endocrine Network Interaction Estimation (QENIE) have been developed, but the in silico predictions of endocrine protein factors still require many additional experimental validations. Therefore, the situation is that there is a need for the development of an in vivo technique that can identify and solve the properties of tissue-specific secretory proteins according to time and space dimensions.

Accordingly, as a result of diligent efforts to overcome the above problems, the inventors of the present invention have been able to develop a technique for labeling secretory proteins when passing through the lumen of the endoplasmic reticulum to enable dynamic tracking of secretory proteins in cells or in vivo tissue-specifically, and the technique was named iSLET (in situ Secretory protein Labeling via ER-anchored TurboID). Meanwhile, when the above technique was used, it was confirmed that the secretory protein secreted and circulating in the mouse liver can be tracked and identified in plasma, and thus, the present invention was completed by demonstrating that efficient in situ labeling of tissue-specific proteome is possible.

DISCLOSURE

Technical Problem

An object of the present invention is to provide a method of identifying an intracellular secretory protein or tissue-specific secretory protein.

Technical Solution

In order to achieve the above object, the present invention provides a fusion protein in which an ER lumen targeting membrane protein and a biotin ligase are fused.

In the present invention, the ER lumen targeting membrane protein has ER transmembrane domain.

In the present invention, the ER lumen targeting membrane protein is protein transport protein Sec61 subunit beta (SEC61B).

In the present invention, the biotin ligase includes at least one selected from the group consisting of BirA, BioID and TurboID.

In the present invention, the biotin ligase is fused to the N-terminus or C-terminus of the ER lumen targeting membrane protein or or inserted into the ER lumen targeting membrane protein.

In the present invention, the fusion protein labels a secretory protein or peptide in the process of the secretory protein or peptide passing through the endoplasmic reticulum membrane.

In addition, the present invention provides a method for identifying an intracellular secretory protein or tissue-specific secretory protein, including the steps of:

(a) expressing the fusion protein in cells or expressing the fusion protein tissue-specifically in a subject;
(b) obtaining a biotinylated protein or peptide from a sample of the cells or subject; and
(c) analyzing the protein or peptide to identify a secretory protein or peptide.

In the above method, step (a) treats biotin after expressing the fusion protein in cells or expressing the fusion protein tissue-specifically in a subject.

In the present invention, the ER lumen targeting membrane protein has ER transmembrane domain.

In the above method, the ER lumen targeting membrane protein is protein transport protein Sec61 subunit beta (SEC61B).

In the above method, the biotin ligase includes at least one selected from the group consisting of BirA, BioID and TurboID.

In the above method the biotin ligase is fused to the N-terminus or C-terminus of the ER lumen targeting membrane protein or inserted into the ER lumen targeting membrane protein.

In the above method, the fusion protein labels a secretory protein or peptide in the process of the secretory protein or peptide passing through the endoplasmic reticulum membrane.

In the above method, the cells are selected from the group consisting of cancer cells, kidney cells, skin cells, ovarian cells, synovial cells, peripheral blood mononuclear cells, fibroblasts, fibrous cells, nerve cells, epithelial cells, keratinocytes, hematopoietic cells, melanocytes, chondrocytes, macrophages, muscle cells, blood cells, bone marrow cells, lymphocyte cells, mononuclear cells, lung cells, pancreatic cells, liver cells, gastric cells, intestinal cells, cardiac cells, brain cells, bladder cells, urethral cells, embryonic germ cells, cumulus cells and a combination thereof.

In the above method, step (a) either (i) delivers a recombinant virus expressing the fusion protein to a subject tissue-specifically, or (ii) expresses the fusion protein by using a transgenic mouse expressing the fusion protein tissue-specifically by Cre-LoxP.

In the above method, the recombinant virus is any one selected from the group consisting of adenovirus, retrovirus, herpesvirus, lentivirus, herpesvirus and reovirus.

In the above method, the tissue is any one selected from the group consisting of brain, lung, liver, stomach, intestine, heart, kidney, skin, ovary, testis, nerve, muscle, bone marrow, bone, adrenal gland, pituitary, prostate, spleen, thyroid, uterus, adipose, artery, vein, pancreas and bladder.

In the above method, the biotinylated protein or peptide is obtained by adding Streptavidin beads, Neutravidin beads or anti-biotin beads.

In the above method, the sample is any one selected from the group consisting of cells, blood, urine and body fluid.

In the above method, the analysis is performed by using at least one method selected from the group consisting of mass spectrometry, western blot, fluorescence microscopy, dot blot and ELISA.

Advantageous Effects

When the method according to the present invention is used, it is possible to clearly identify an intracellular secretory protein and to dynamically track the spatiotemporal dynamics of a secretory protein secreted from a specific tissue in a living subject such that it can be effectively utilized for the research on endocrine signals between tissues, and particularly, since it can be applied in situ, the scope of application can be further expanded. Therefore, the present invention can be applied to various disease models or tissues to discover new biomarkers and therapeutic target proteins associated with diseases.

DESCRIPTION OF DRAWINGS

FIG. 4 at b shows the western blot results for the culture supernatants of NIH-3T3 cells transfected with a biotinylated protein (Streptavidin-Alexa) and TurboID (Anti-V5) or GFP (control group), TurboID-KDEL (KDEL) or Sec61b-TurboID (Sec61b) expression plasmids in cell lysates. Anti-GAPDH is a loading control. Asterisks indicate self-biotinylated TurboID-KDEL or Sec61b-TurboID.

FIG. 6 at a shows the western blot results for a biotin-labeled protein (Streptavidin-HRP) and Sec61b-TurboID (Anti-VS) in the cell lysates or culture supernatants of HepG2 cells transfected with GFP (control group) or Sec61b-TurboID (Sec61b) expression plasmids; and FIG. 6 at b shows the western blot results for a biotin-labeled protein (Streptavidin-HRP) and TurboID in the cell lysates or culture supernatants of HepG2 cells transfected with GFP (control group), TurboID-KDEL (KDEL) or Sec61b-TurboID (Sec61b) expression plasmids. Anti-GAPDH is a loading control. Asterisks indicate self-biotinylated TurboID-KDEL or Sec61b-TurboID.

FIG. 9 at b is the time course blot result for the turnover of the biotinylated protein (Streptavidin-HRP) in the cell lysates of HepG2 cells transfected with Sec61b-TurboID expression plasmid after biotin washing; and FIG. 9 at c shows the quantification and plotting results of a time course blot for the turnover of the biotinylated protein shown in FIG. 9 at b. Asterisk indicates Sec61b-TurboID.

FIG. 18 at b shows the Streptavidin-HRP detection of a biotinylated protein and the Ponceau S detection of proteins from mouse plasma after the adenovirus delivery of Sec61b-TurboID; and FIG. 18 at c shows the profile of biotinylated secretory proteins generated by Sec61b-TurboID in the plasma of liver cell line HepG2, AML12, and liver iSLET mice.

FIG. 19 at a shows the western blot results for Sec61b-TurboID (Anti-V5) in liver and other tissues (eWAT: epididymal White Adipose Tissue, iWAT: inguinal White Adipose Tissue, BAT: Brown Adipose Tissue, TA: Tibialis Anterior muscle); and FIG. 19 at b shows the hematoxylin and eosin staining results of the mouse liver tissue treated as follows: Vehicle only (Veh), GFP expressing adenovirus (AdV-GFP), Sec61b-TurboID expressing adenovirus (AdV-TurboID).

FIG. 20 at b shows the results of specificity analysis for the biotinylated proteins by using SignalP 5.0, the human protein atlas and scientific literature.

FIG. 22 at b shows blood glucose (n=3 per group) of vehicle or S961 injected mice; and FIG. 22 at c shows biotinylated secretory proteins detected in the plasma of liver iSLET mice injected with vehicle or S961 (AHSG, alpha-2-HS-glycoprotein; FETUB, fetuin-B; ITIH1, inter-alpha-trypsin inhibitor heavy chain H1; AFM, afamin; APOH, beta-2-glycoprotein 1; ORM1, alpha-1-acid glycoprotein 1; EGFR, receptor protein-tyrosine kinase; CFB, complement factor B; CES1B, carboxylic ester hydrolase; C4B, complement C4-B; C5, complement C5; C6, complement component 6; C8B, complement component C8 beta chain; F13B, coagulation factor XIII B chain; ITIH4, inter alpha-trypsin inhibitor, heavy chain 4; KLKB1, plasma kallikrein; PON1, serum paraoxonase/arylesterase 1).

MODES OF THE INVENTION

Hereinafter, the present invention will be described in more detail. Unless defined otherwise, all technical and scientific terms used herein have the same meanings as commonly understood by one of ordinary skill in the art to which the present invention pertains, and in case of conflict, the description of the present specification including definitions will take precedence.

Figure 1:
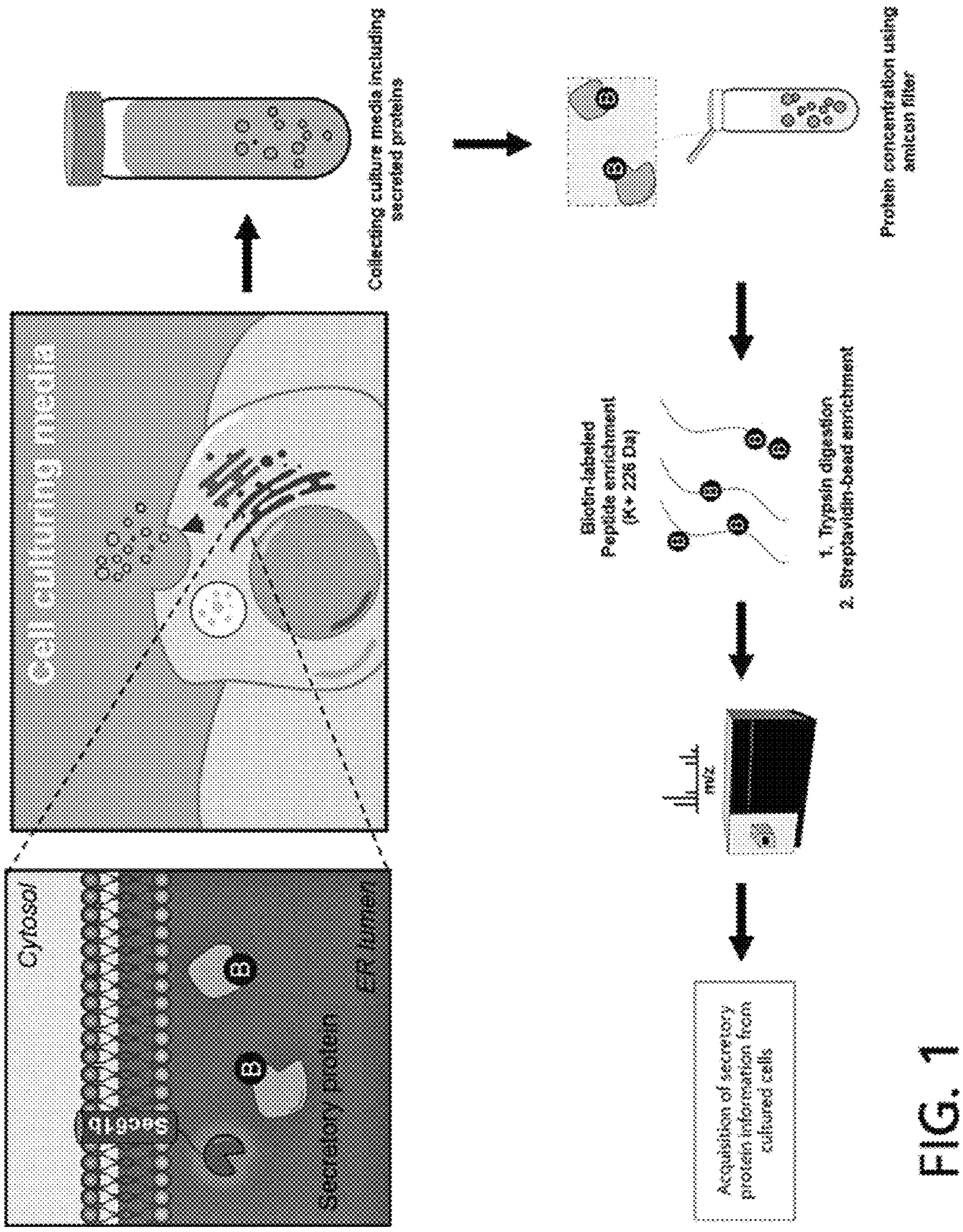
FIG. 1 is a mimetic diagram of the method for providing the location information of a secretory protein in a cell according to an exemplary embodiment of the present invention.
Figure 2:
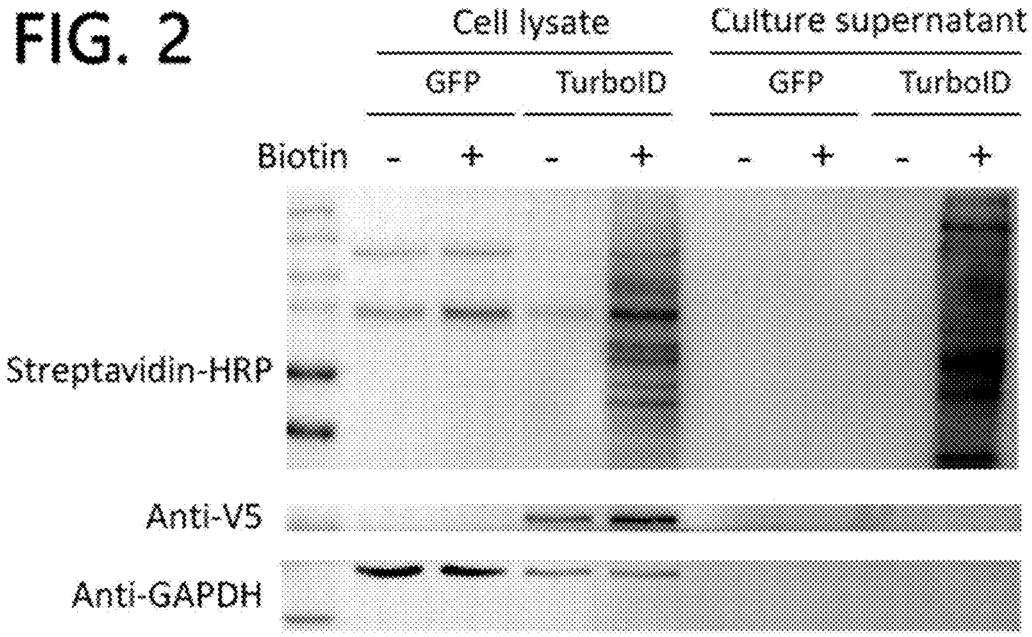
FIG. 2 shows the western blot results for a biotin-labeled protein (Streptavidin-HRP) and TurboID (Anti-V5) in the lysates and culture supernatants of Lewis Lung cancer (LLC) cells transfected with retroviruses having an endoplasmic reticulum membrane protein-biotin ligase (Sec1b-TurboID) and a control group (GFP), respectively, according to an exemplary embodiment of the present invention (anti-GAPDH means a loading control).

The present invention is a technique that can identify a secretory protein by attaching a biotin ligase to an ER lumen facing peptide to express in cells, treating the same with biotin to selectively label a secretory protein secreted from the endoplasmic reticulum with biotin, and then adding Streptavidin beads to a lysate supernatant in which the cells are lysed to isolate the biotin-labeled secretory protein and analyzing the same (FIGS. 1 and 2).

Figure 3:
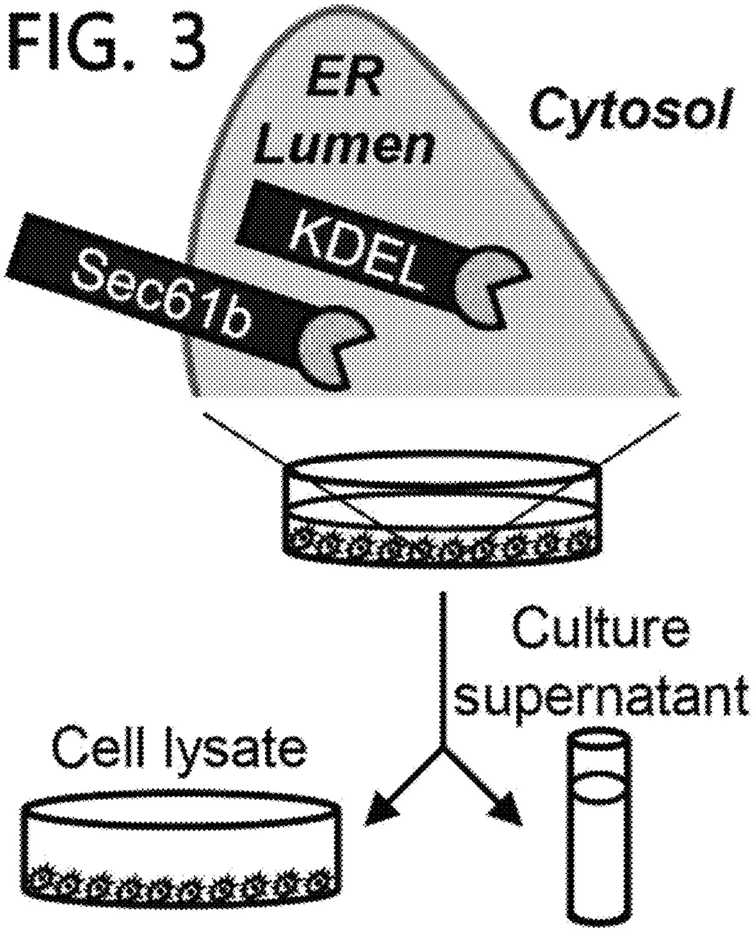
FIG. 3 shows a schematic diagram for the labeling of secretory proteins by ER-localized TurboID (TurboID-KDEL) or ER-anchored TurboID (Sec61b-TurboID).
Figure 4:
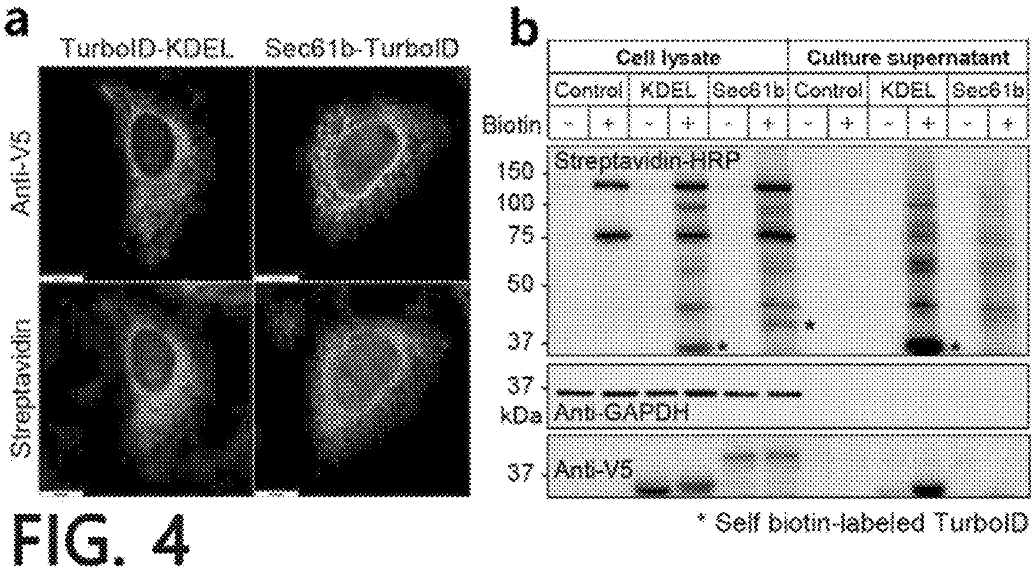
FIG. 4 at a shows the immunofluorescence localization of TurboID (Anti-V5) and a biotinylated protein (Streptavidin-Alexa) in HeLa cells transfected with TurboID-KDEL or Sec61b-TurboID expression plasmids.

Specifically, in the present invention, in order to locate TurboID, which is one of the biotin ligases, in the endoplasmic reticulum lumen, TurboID (Sec61b-TurboID) combined with Sec61b, which is an ER lumen facing peptide, was constructed, and after expressing the same in HepG2 cells, which are a human liver cell line, biotin was treated to induce the labeling of secretory proteins (FIG. 3). Afterwards, the cell lysate and the culture supernatant were respectively separated and the biotin-labeled protein was detected using a Streptavidin antibody, and as a result, it was confirmed that Sec61b-TurboID was not secreted from the endoplasmic reticulum, whereas the secretory protein of the culture supernatant was effectively biotin-labeled (FIG. 4 at b).

Figure 12:
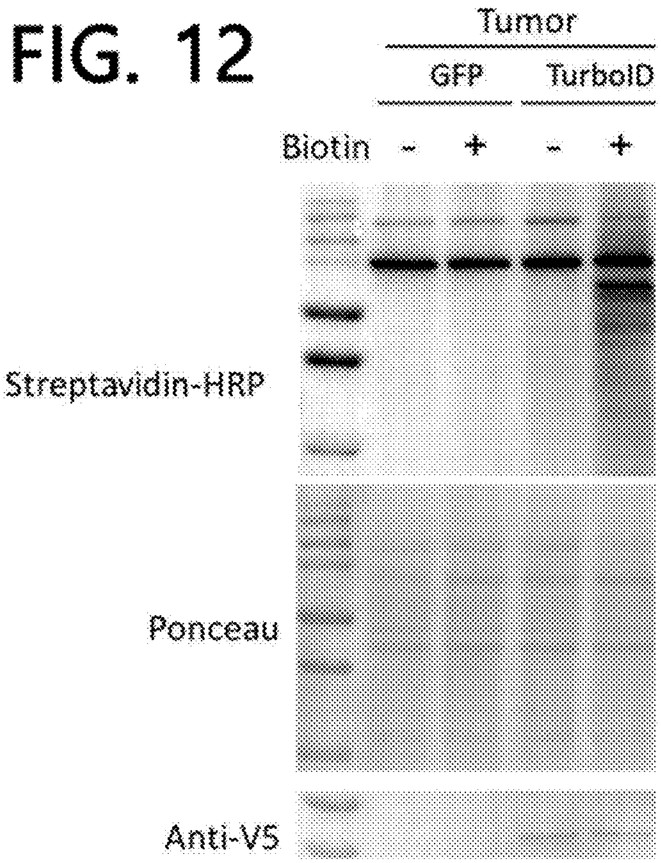
FIG. 12 shows the western blot results for the biotin-labeled protein (Streptavidin-HRP) and TurboID (Anti-V5) in the lysates of tumors formed by transplantation of LLC cells expressing Sec61b-TurboID and a control group (Ponceau indicates a loading control).
Figure 16:
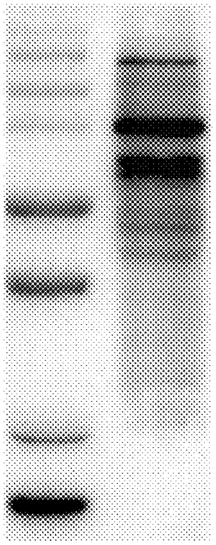
FIG. 16 shows the western blot results for the biotin-labeled protein (Streptavidin-HRP) in tumors.
Figure 17:
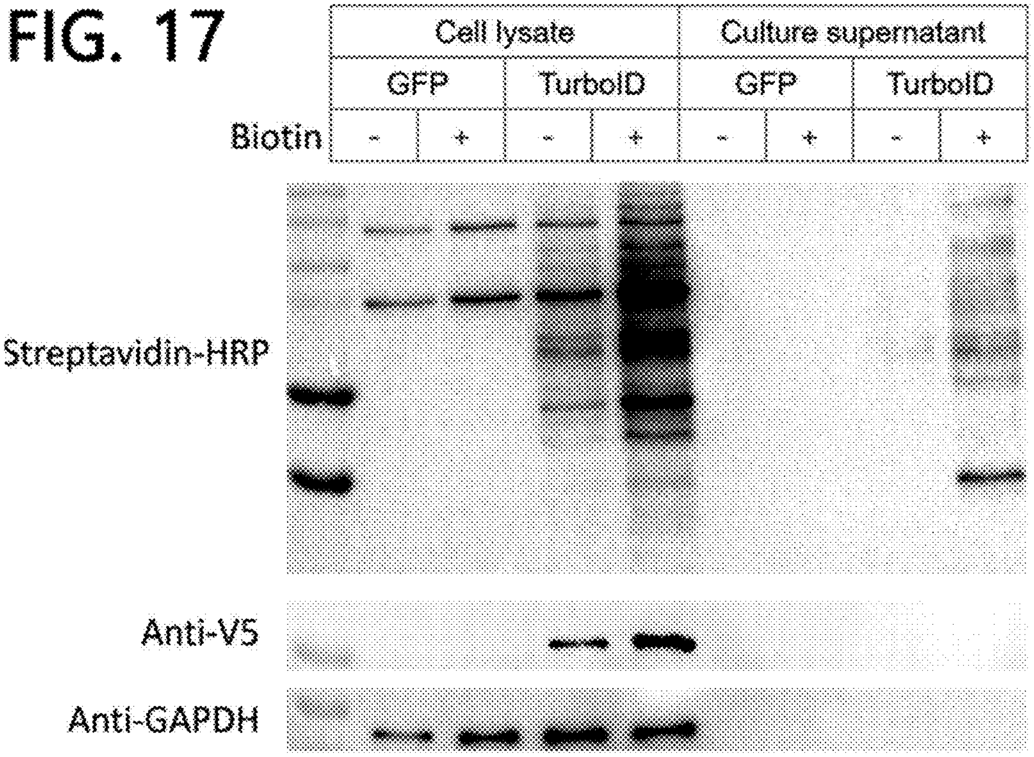
FIG. 17 shows the western blot results for the biotin-labeled protein (Streptavidin-HRP) and TurboID (Anti-V5) in the lysates and culture supernatants of C26 colon cancer cells transfected with retroviruses of Sec61b-TurboID and a control group (GFP) according to an exemplary embodiment of the present invention (Anti-GAPDH means a loading control).

Further, in the present invention, Lewis lung carcinoma (LLC) or mouse colon carcinoma (C26) cell lines expressing Sec61b-TurboID were transplanted into mice, and after biotin was administered into the mice by intraperitoneal injection for 3 days, plasma was separated and analyzed, and as a result, it was confirmed that the secretory protein was biotin-labeled (FIGS. 12 and 16). Meanwhile, as a result of analyzing the secretory proteins by transplanting the C26 cell line, a total of 421 secretory proteins could be identified (FIG. 17, Table 1).

Figure 18:
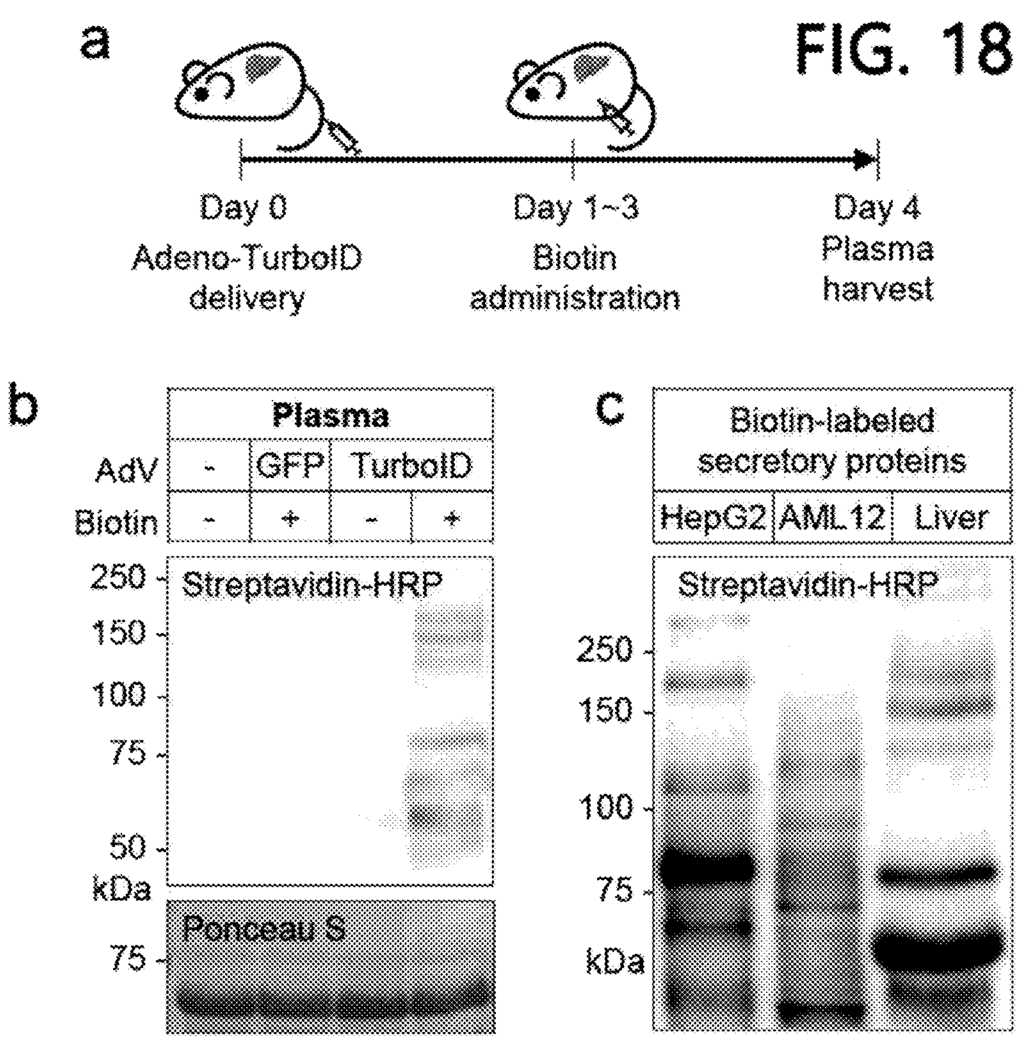
FIG. 18 at a shows an experimental design for the expression of adenovirus of Sec61b-TurboID and biotin labeling in mouse liver tissue.

In another exemplary embodiment, Sec61b-TurboID adenovirus was constructed and Sec61b-TurboID was delivered to the mouse liver through intravenous injection, and after biotin was administered intro the mice by intraperitoneal injection for 3 days, plasma was separated and analyzed (FIG. 18 at a), and as a result, biotin-labeled proteins were detected while TurboID was expressed only in the plasma of the mice administered with biotin (FIG. 18 at b). It was confirmed that such in vivo liver-derived secretory proteins were significantly different from the secretory proteins of the liver cell line through cell culture (FIG. 18 at c).

Figure 22:
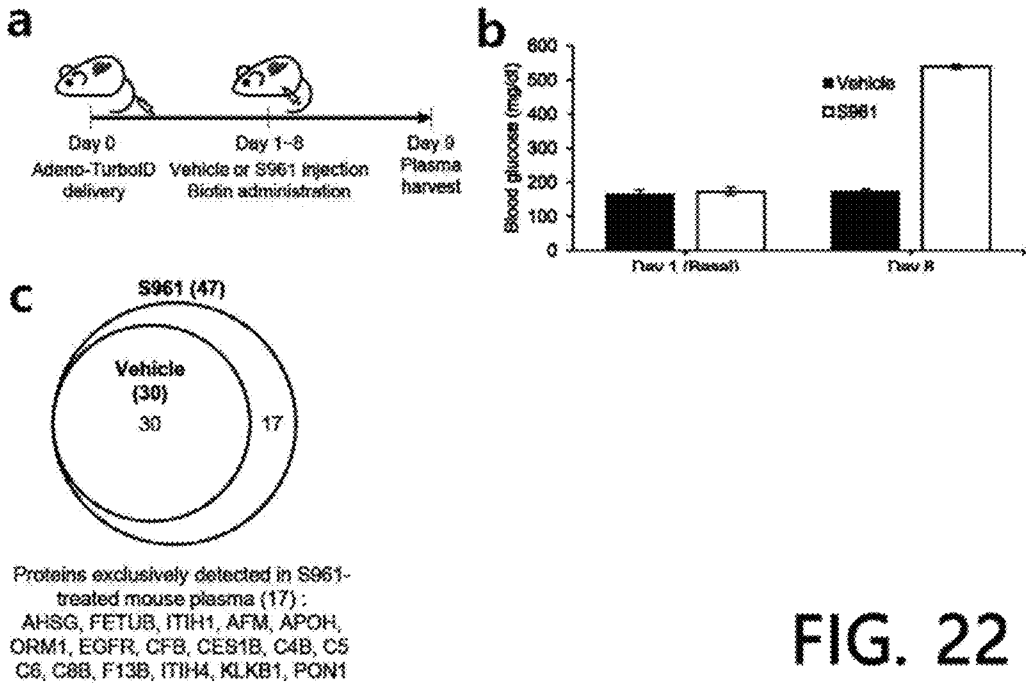
FIG. 22 at a shows an experimental design for the expression of adenovirus and biotin labeling of Sec61b-TurboID in the S961—induced insulin resistance model.

Meanwhile, insulin resistance is a major cause of type 2 diabetes, and it refers to a state in which blood sugar control by insulin is not normal. In order to determine whether it is possible to apply Sec61b-TurboID to a disease model, insulin resistance was induced in mice for 8 days using an insulin receptor antagonist called S961 (FIG. 22 at a), and as a result, a sharp rise in blood sugar was observed (FIG. 22 at b). Afterwards, plasma was separated from a control group (Vehicle) and an experimental group (S961) and mass spectrometry was performed, and as a result, 30 and 47 proteins were identified, respectively (FIG. 22 at c), of which 17 proteins were specifically detected only in the experimental group (S961). In particular, proteins associated with insulin resistance, such as alpha-2-HS-glycoprotein (AHSG), fetuin-B (FETUB), inter-alpha-trypsin inhibitor heavy chain H1 (ITIH1), afamin (AFM) or apolipoprotein H (APOH) were confirmed.

Figure 23:
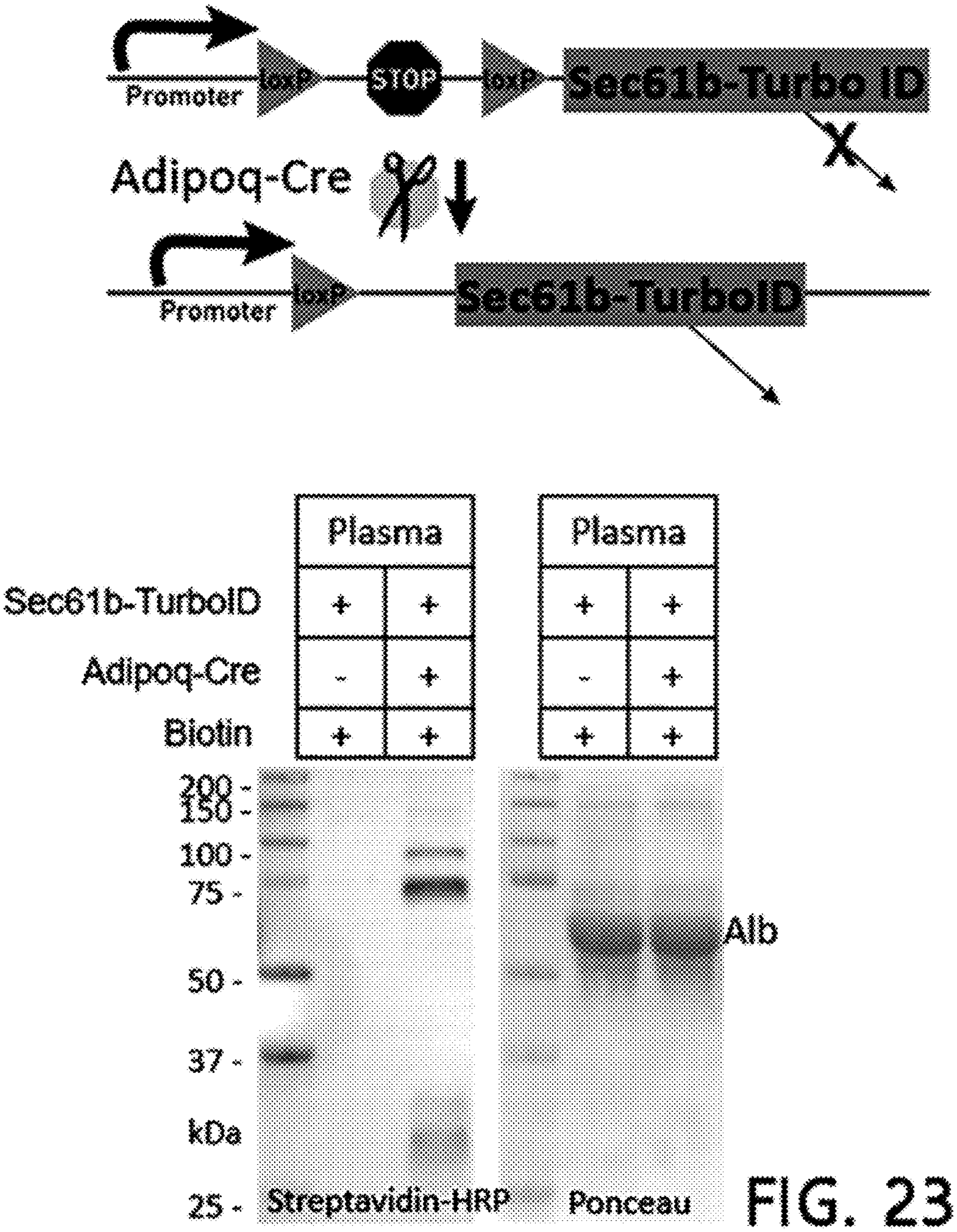
FIG. 23 is a result of confirming the biotin labeling results of adipose tissue-specific secretory proteins by constructing transgenic mice expressing adipose tissue-specific Sec61b-TurboID using the Cre-LoxP system.

In another exemplary embodiment, transgenic mice expressing Sec61b-TurboID adipose tissue-specifically were prepared, and as a result of intraperitoneal injection of biotin into the mice, adipose tissue-specifically biotin-labeled proteins were confirmed (FIG. 23).

As such, in the present invention, iSLET (in situ Secretory protein Labeling via ER-anchored TurboID) that labels secretory proteins when they pass through the endoplasmic reticulum lumen has been developed to enable dynamic tracking of tissue-specific secretory proteins in vivo, and these results demonstrate that iSLET technology can be successfully applied to animal disease models for the discovery of tissue-specific secretory proteins with potential value as therapeutic targets or biomarkers.

iSLET is the first application of proximity labeling to dynamically track tissue-specific secretory proteins in the circulation of live mice. Liver iSLET mice may be utilized to deepen our understanding of liver endocrine signaling by investigating secretory protein profiles under various physiological or disease conditions. Another valuable feature of iSLET technology is that it can be applied to longitudinal secretome profiling studies by drawing blood samples, which contain labeled secretome, at multiple time points from the same individual. Pre-immunodepletion of abundant plasma proteins such as ALB and PZP can further enhance coverage of secretory protein profiles identified from iSLET studies.

Furthermore, iSLET is a versatile and adaptable in vivo approach to profile tissue-specific secretory proteins as iSLET expression in a tissue-of-interest can be achieved using a variety of existing conditional gene expression strategies. iSLET will be a valuable experimental tool for the identification of tissue-specific endocrine proteins and the deconvolution of complex interorgan communication networks.

Therefore, in one aspect, the present invention relates to a fusion protein in which an ER lumen targeting membrane protein and a biotin ligase are fused.

In the present invention, the ER lumen targeting membrane protein may have ER transmembrane domain.

In the present invention, the ER lumen targeting membrane protein may be characterized as protein transport protein Sec61 subunit beta (SEC61B), but is not limited thereto.

In order to accurately identify a secretory protein, it is preferable to fuse a biotin ligase with an ER lumen targeting membrane protein., and for example, when KDEL, which is an ER retention signal peptide, is fused with a biotin ligase, the corresponding fusion protein is secreted out of the endoplasmic reticulum and also labels proteins in the cytoplasm, and by compensating for the disadvantage of not being able to accurately identify secretory proteins, the fusion protein according to the present invention has the advantage of specifically labeling proteins that pass through the endoplasmic reticulum membrane.

In the present invention, as a preferred embodiment of the ER lumen targeting membrane protein, protein transport protein Sec61 subunit beta (SEC61B, SEQ ID NO: 1) may be used. In the present invention, by using SEC61B immobilized to the endoplasmic reticulum as a target protein, the secretory protein secreted from the endoplasmic reticulum may be labeled with biotin, unlike KDEL, which is not fixed to the conventional endoplasmic reticulum and has the potential to escape into other locations or cytoplasm of the cell.

In the present invention, the ER lumen targeting membrane protein may be an ER lumen facing peptide.

In the present invention, the biotin ligase may include at least one selected from the group consisting of BirA, BioID and TurboID, but is not limited thereto. The BirA is a protein derived from *Escherichia coli*, and it is a 35-kDa DNA-binding biotin protein ligase. The BioID and TurboID (SEQ ID NO: 2) may respectively mean mutations of the BirA. Specifically, among the biotin ligases, BirA only biotinylates acetyl-CoA carboxylase, but such mutations may biotinylate several surrounding proteins.

In the present invention, APEX or APEX2, which are well known as biotin ligases, may induce cytotoxicity according to the use of hydrogen peroxide, and when it is used for the in vivo identification of secretome according to the present invention, inaccurate results may be derived.

In the present invention, the biotin ligase may be characterized in that it is fused to the N-terminus or C-terminus of the ER lumen targeting membrane protein or inside the ER lumen targeting protein, and preferably, it may be fused to the C-terminus of the ER lumen targeting membrane protein, but is not limited thereto. That is, in the present invention, the structure of the fusion protein may be appropriately modified such that the biotin ligase is located in the lumen of the endoplasmic reticulum.

In the present invention, the fusion protein uses general conditions which are commonly used in the art for introducing a DNA construct (e.g., vector, plasmid, virus, etc.), which is capable of expressing the same in cells, into cells, to express the protein in the cells, and for example, it will be possible to express by culturing in a temperature range of about 30° C. to about 38° C., for about 12 hours to 24 hours.

In the present invention, the fusion protein may biotin-label some proteins present in the lumen of the endoplasmic reticulum, but mainly, it may be characterized in that it effectively labels a secretory protein in the process of the secretory protein passing through the endoplasmic reticulum membrane.

In the present invention, the fusion protein may be characterized in that the ER lumen targeting membrane protein and the biotin ligase are bound by a linker.

As used herein, the term "linker" refers to a linkage that connects two different fusion partners (e.g., biological polymers, etc.) by hydrogen bonding, electrostatic interaction, van der Waals force, disulfide bond, salt bridge, hydrophobic interaction, covalent bonding and the like, and specifically, it may have at least one cysteine capable of participating in at least one disulfide bond under physiological conditions or other standard peptide conditions (e.g., peptide purification conditions, peptide storage conditions), and in addition to simply connecting each fusion partner, it may perform a function of providing a gap having a certain size between fusion partners or perform a function as a hinge providing flexibility or rigidity to the fusion body. The linker may be a non-peptide linker or a peptide linker, and may include all those that are directly linked by a peptide bond, a disulfide bond or the like.

In another aspect, the present invention relates to a method for identifying an intracellular secretory protein or tissue-specific secretory protein, including the steps of:

(a) expressing the fusion protein in cells or expressing the fusion protein tissue-specifically in a subject;

(b) obtaining a biotinylated protein or peptide from a sample of the cells or subject; and (c) analyzing the protein or peptide to identify a secretory protein.

In the present invention, the step (a) may be characterized in that the fusion protein is expressed in cells or the fusion protein is expressed tissue-specifically in a subject and then biotin is treated, but this biotin treatment step, which can confirm that some secretory proteins are biotinylated without separate biotin treatment, may be omitted.

In the method according to the present invention, the ER lumen targeting membrane protein may have ER transmembrane domain.

In the method according to the present invention, the ER lumen targeting membrane protein may be characterized as protein transport protein Sec61 subunit beta (SEC61B), but is not limited thereto.

In the method according to the present invention, the biotin ligase may include at least one selected from the group consisting of BirA, BioID and TurboID, but is not limited thereto.

In the method according to the present invention, the biotin ligase may be fused to the N-terminus or the C-terminus of the ER lumen facing peptide or inside of the ER lumen targeting protein, but is not limited thereto.

In the method according to the present invention, the fusion protein may label a secretory protein in the process of the secretory protein passing through the endoplasmic reticulum membrane, but is not limited thereto.

In the method according to the present invention, the cells may be selected from the group consisting of cancer cells, kidney cells, skin cells, ovarian cells, synovial cells, peripheral blood mononuclear cells, fibroblasts, fibrous cells, nerve cells, epithelial cells, keratinocytes, hematopoietic cells, melanocytes, chondrocytes, macrophages, muscle cells, blood cells, bone marrow cells, lymphocyte cells, mononuclear cells, lung cells, pancreatic cells, liver cells, gastric cells, intestinal cells, cardiac cells, brain cells, bladder cells, urethral cells, embryonic germ cells, cumulus cells and a combination thereof, but is not limited thereto.

In the method according to the present invention, the step (a) may either (i) deliver a recombinant virus expressing the fusion protein to a subject tissue-specifically, or (ii) express the fusion protein by using a transgenic mouse expressing the fusion protein tissue-specifically by Cre-LoxP, but is not limited thereto.

In the method according to the present invention, the virus may be any one selected from the group consisting of adenovirus, retrovirus, herpesvirus, lentivirus, herpesvirus and reovirus, but is not limited thereto.

In the method according to the present invention, the subject may be an animal excluding a human, a biomimetic system (organoid, etc.) or various disease models, and the model may be an insulin resistance model. When the subject is a human, there may be risks such as gene delivery and the like.

In the method according to the present invention, the tissue may be any one selected from the group consisting of brain, lung, liver, stomach, intestine, heart, kidney, skin, ovary, testis, nerve, muscle, bone marrow, bone, adrenal gland, pituitary, prostate, spleen, thyroid, uterus, adipose, artery, vein, pancreas and bladder, but is not limited thereto, and any tissue that is capable of expressing the fusion protein may be applied without limitation, but it may be preferably a liver.

In the method according to the present invention, the step (b) of obtaining a biotinylated protein or peptide from a sample of the cells or subject is one embodiment, and it may be characterized in that after lysing the biotin-treated cells, the biotinylated protein or peptide is obtained from the supernatant. In another aspect, it may be characterized in that a biotinylated protein or peptide is obtained from a supernatant obtained by centrifuging a sample isolated from a biotin-treated subject, but is not limited thereto.

In the method according to the present invention, the biotinylated protein or peptide may be obtained by adding Streptavidin beads, Neutravidin beads or anti-biotin beads, but is not limited thereto.

In the method according to the present invention, the sample may be any one selected from the group consisting of cells, blood, urine and body fluid, but is not limited thereto, and preferably, the sample may be blood, and more preferably, it may be plasma.

In the method according to the present invention, the analysis may be performed by using at least one method selected from the group consisting of mass spectrometry, western blot, fluorescence microscopy, dot blot and ELISA, but is not limited thereto.

For example, the mass spectrometry may be characterized in that the protein or peptide is analyzed using a mass spectrometer, and various types of mass spectrometry (MS) capable of protein measurement may be used as the mass spectrometer. Specifically, as the mass spectrometer, an LC-MS device may be used, and preferably, an LTQ-Orbitrap mass spectrometer may be used, but is not limited thereto.

In the present invention, the Streptavidin beads may be magnetic beads coated with Streptavidin.

The conventional secretory protein research methods mainly analyze all proteins present in cell culture fluids or animal blood directly, and there were disadvantages in that cells from which the analyzed protein was derived could not be clearly distinguished, and it could be contaminated with cytoplasmic proteins bursting from dead cells rather than secretory proteins secreted through the normal secretory pathway.

However, the present invention, which was conceived to overcome these disadvantages, may selectively biotin-label a secretory protein synthesized in the ER lumen and secreted into the cytoplasm by attaching a biotin ligase to the ER lumen facing peptide in the ER lumen direction, mainly in the process of passing through the ER membrane, thereby identifying the secretory protein of cells.

In addition, when the present invention is used, secretory proteins may be identified and tracked not only at the level of cultured cells but also in living animal models, and thus, it may be used for basic life science research, drug development, medical diagnostic marker research and the like that are related to secretory proteins. Specifically, cells expressing the fusion protein according to the present invention may be xenotransplanted into real living animals or tissue-specifically expressed by a virus to identify and track the tissue-specific secretory protein and use the same for research.

The present invention may be widely applied to basic life science research, drug development and diagnostic research that are related to secretory proteins. Specifically, cancer cachexia, which induces sarcopenia among secretory proteins from cancer cells, may be used as a medical diagnostic marker. In addition, by continuously tracking the labeled secretory protein, it is possible to determine which organ the corresponding secretory protein flows into and communicates with. That is, through additional research on the secretory protein, it is possible to secure relevance to sarcopenia and develop an inhibitor of the corresponding protein, thereby becoming an important target for a therapeutic agent of sarcopenia.

The present invention may also be applied to the study of secretory proteins from various cancer cells including colon cancer cells or patient cell lines, and it may be used not only for cancer cells, but also for studies on the identification of secretory proteins in other cancer cells and patient cells. The secretory protein identified from each cell may be used as a target of a therapeutic agent or as a diagnostic marker. That is, by securing highly reliable secretory protein candidates, it may be utilized for the use of finding out information such as the effects of disease-causing proteins and drugs, and thus may be widely utilized in the diagnostic and drug development markets.

Hereinafter, the constitution of the present invention and its effects will be described in more detail through specific examples and comparative examples. However, these examples are for describing the present invention in more detail, and the scope of the present invention is not limited to these examples.

Example 1. Identification of Secretory Proteins In Vitro

To engineer a TurboID based tool for labeling secretory proteins located in the ER lumen, we first tested the functionality of two ER lumen-targeted TurboIDs, an ER lumen-localized TurboID (TurboID-KDEL) and an ER membrane-anchored TurboID (Sec61b-TurboID), in cultured cells. We transfected either TurboID-KDEL or Sec61b-TurboID expression constructs, both of which also express a V5 epitope tag, to cultured mammalian cells and analyzed biotinylated proteins in cell lysates and culture supernatant (FIG. 3).

1-1. Cell Culture and Transfection

All cell lines were purchased from the American Type Culture Collection (ATCC; www.atcc.org) and cultured according to standard mammalian tissue culture protocols at 37° C., 5% $CO_2$ in a humidified incubator. NIH-3T3 cells were cultured in DMEM (Hyclone, SH30243.01) supplemented with 10% bovine serum (Invitrogen, 16170-078) and antibiotics (100 units/mL penicillin, 100 μg/mL streptomycin). HepG2 cells were cultured in DMEM (Hyclone, SH30243.01) supplemented with 10% fetal bovine serum (Gibco, 16000-044), 1% GlutaMax (Gibco, 35050061) and antibiotics (100 units/mL penicillin, 100 μg/mL streptomycin). AML12 cells were cultured in DMEM/F12 (Gibco, 11320-033) supplemented with 10% FBS, 1% Insulin-Transferrin-Selenium (Gibco, 41400-045) and antibiotics. 293AD cells and HeLa cells were cultured in DMEM supplemented with 10% FBS and antibiotics. For transient plasmid transfection, cells were plated at $2.5\times10^5$ cells/well in a 6-well culture plate. 24 h after plating, cells were transfected using 6 μL jetPEI (Polyplus) and 2.5 μg GFP, TurboID-KDEL, or Sec61b-TurboID plasmids according to manufacturer protocol.

1-2. Construction of Retroviruses and Stable Cell Lines

The pMSCV-PIG (Puro-IRES-GFP) vector, which is a retroviral vector, was digested with XhoI and EcoRI, and then the SEC61B-TurboID gene was inserted. Afterwards, Phoenix cells were transfected with the corresponding retrovirus and cultured for 24 hours. Then, the culture supernatant was mixed with a fresh cell culture solution at 1:2 and treated with 6 μg/mL polybrene in the target cell line for 24 hours. Afterwards, only the stably transfected cell lines were selected by treating the target cell lines with 2 to 4 μg/mL of puromycin.

1-3. In Vitro Biotin Labeling and Cell Lysate Preparation 5 mM Biotin (Sigma, B4639) stock was prepared in DPBS with NaOH titration. 24 h after plasmid transfection or adenoviral transduction, cells were washed with PBS and further maintained for 16 hr in culture medium supplemented with 50 μM biotin. For the biotin washout experiment, following biotin labeling, cells were washed with PBS and further maintained in fresh culture medium. Cells were lysed by RIPA (Pierce, 89901) with Xpert Protease Inhibitor Cocktail (GenDEPOT, P3100-010) and incubated 30 min at 4° C. Lysates were cleared by centrifugation at 16,000 g for 20 min at 4° C. The clear supernatant was used for western blots. Protein concentrations were determined by BCA assay (Pierce, 23225)

1-4. Culture Supernatant Protein Preparation

Cells were washed with PBS twice and the culture medium was changed to phenol red free DMEM (Hyclone, SH30284.01) supplemented 1 mM pyruvate (Sigma, S8636) with or without 50 μM biotin. For secretory pathway inhibition, 1× GolgiPlug™ (BD, 555029), which contains Brefeldin A, was treated with biotin. 16 h after biotin incubation, culture supernatant was centrifuged at 400 g for 5 min and the supernatant was filtered by 0.22 μm PES syringe filter (Millipore, SLGP033RB). The filtered supernatant was concentrated by Amicon Ultra 2 mL 10K (Millipore, UFC201024) with buffer exchange to 50 mM Tris-HCl pH 6.8. Concentrated supernatant was used for western blots. Protein concentrations were determined by BCA assay 1-5. Western Blots Denatured proteins were separated on 12% SDS-PAGE gels. Separated proteins were transferred to PVDF membrane (Immobilon-P, IPVH00010). Membranes were stained with Ponceau S for 15 min, washed with TBS-T (25 mM Tris, 150 mM NaCl, 0.1% Tween 20, pH 7.5) twice for 5 min, and photographed. Membranes were blocked in 3% BSA in TBS-T for 1 h, washed with TBS-T five times for 5 min each and incubated with primary antibodies, Anti-V5 (Invitrogen, R960-25, 1:10000), Anti-GAPDH (CST, 14C10, 1:5000), in 3% BSA in TBS-T for 16 h at 4° C. Then, membranes were washed five times with TBS-T for 5 min each and incubated with secondary anti-mouse antibodies (Vector, PI-2000, 1:10000) or anti-rabbit antibodies (Vector, PI-1000, 1:10000) for 1 h at room temperature. For detecting biotinylated proteins, blocked membranes were incubated with streptavidin_211 HRP (Thermo, 21126, 1:15000) in 3% BSA in TBS-T for 1 h at room temperature. Membranes were washed five times in TBS-T before detection with chemiluminescent HRP substrate (Immobilon, P90720) and imaged on a ChemiDoc™ XRS+ system (Bio-Rad, 1708265).

1-6. Immunofluorescence Staining

HeLa cells were plated on round coverslips (thickness no. 1, 18 mm radius) and transfected with plasmids. Cells were treated with 50 μM biotin for 30 min. Cells were fixed with 4% paraformaldehyde and permeabilized with ice-cold methanol for 5 min at −20° C. Next, cells were washed with DPBS and blocked for 1 h with 2% dialyzed BSA in DPBS at room temperature. Cells were incubated 1 h at room temperature with the primary antibody, Anti-VS (Invitrogen, R960-25, 1:5000), in blocking solution. After washing four times with TBS-T each 5 min, cells were simultaneously incubated with secondary Alexa Fluor 488 goat anti-mouse immunoglobulin G (IgG) (Invitrogen, A-11001, 1:1000) and Streptavidin-Alexa Fluor 647 IgG (Invitrogen, S11226, 1:1000) for 30 min at room temperature. Cells were then washed four times with TBS-T each 5 min. Immunofluorescence images were obtained and analyzed using a Confocal Laser Scanning Microscope (Leica, SP8X) with White Light Laser (WLL): 470-670 nm (1 nm tunable laser) and HyD detector.

Immunofluorescence analysis of transfected cells with anti-V5 antibody and fluorescence-conjugated streptavidin confirmed expected patterns of ER localization for both TurboID-KDEL and Sec61b-TurboID along with their biotinylated target (FIG. 4 at a). Analysis of biotinylated proteins in control cell lysates revealed the presence of several endogenous biotinylated carboxylases which were not detected in culture supernatant, indicating that these carboxylases are not secreted. In contrast to control cells, a broad array of biotinylated proteins was detected in both the cell lysate and culture supernatant of cells expressing TurboID-KDEL and Sec61b-TurboID in a biotin treatment-dependent manner (FIG. 4 at b).

Figure 5:
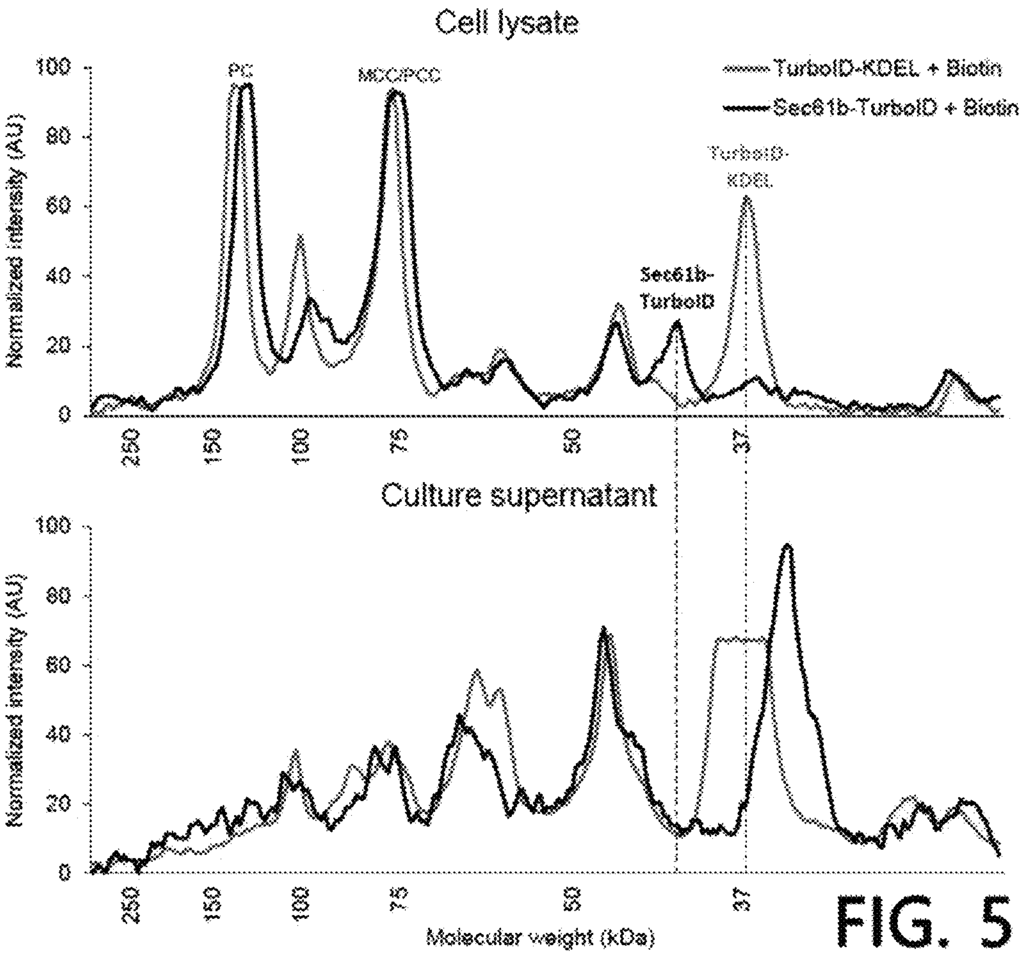
FIG. 5 shows the biotin-labeled proteins of cell lysates and culture supernatants derived from cells expressing TurboID-KDEL or Sec61b-TurboID. The results of line scan analysis of biotin-labeled proteins detected with HRP-Streptavidin in the lysates and culture supernatants of cells transfected with TurboID-KDEL (orange) or Sec61b-TurboID (black) expression plasmids are shown (PC, pyruvate carboxylase; MCC/PCC, methylcrotonyl-CoA carboxylase/propionyl-CoA carboxylase).
Figure 6:
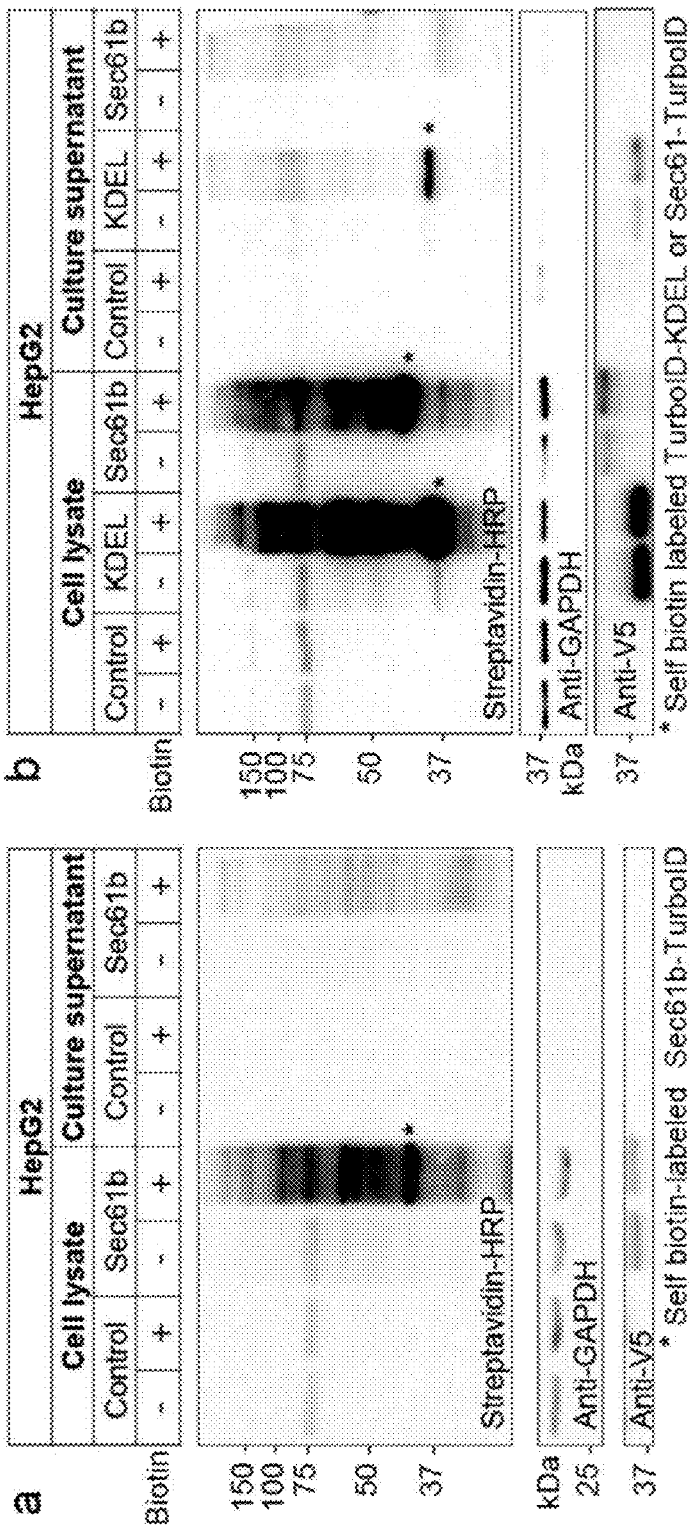
FIG. 6 shows the auto-secretion of TurboID-KDEL in HepG2 cells.

Somewhat unexpectedly, we found that TurboID-KDEL localization was not exclusive to the ER compartment and TurboID-KDEL itself was secreted and readily detectable in the culture supernatant of biotin treated cells (FIG. 4 at b). On the other hand, the ER-anchored Sec61b-TurboID was undetectable in the culture supernatant (FIG. 4 at b and FIG. 5). These data indicate effective retention of Sec61b-TurboID, but not TurboID-KDEL, in the ER compartment through ER membrane-tethering action of the single transmembrane domain of Sec61b. We also confirmed that Sec61b-TurboID robustly labeled secretory proteins without self-secretion in a HepG2 human liver cell line, whereas TurboID-KDEL was again found to be secreted into the culture supernatant (FIG. 6).

Figure 7:
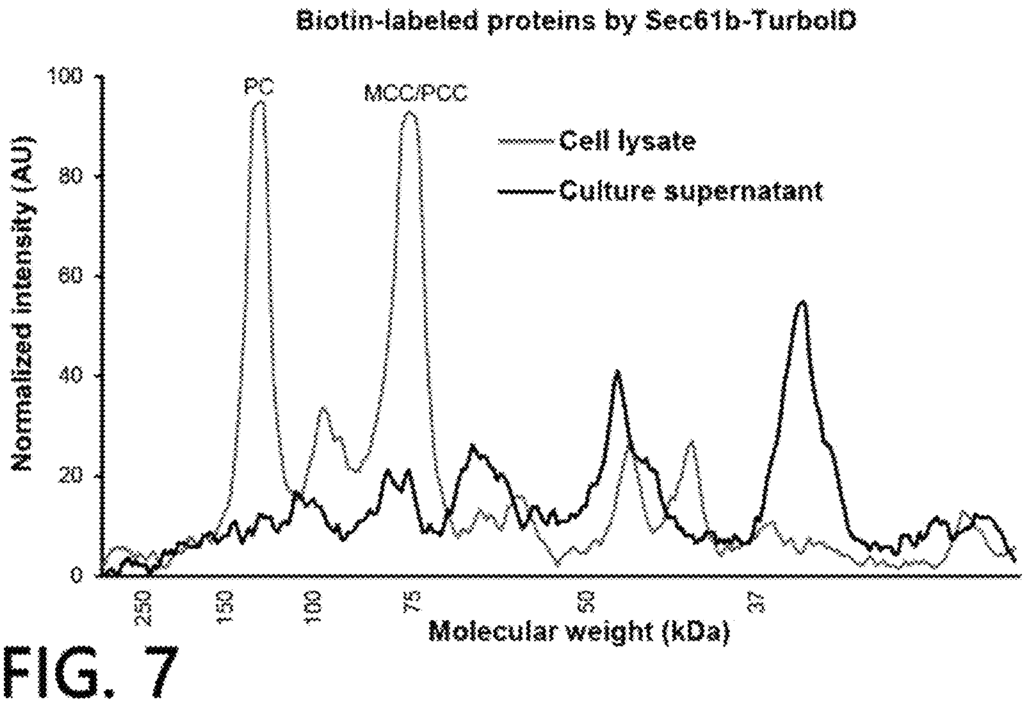
FIG. 7 shows the results of line scan analysis of biotinylated proteins in the cell lysates (orange) or culture supernatants (black) of NIH-3T3 cells transfected with Sec61b-TurboID expression plasmid and treated with biotin (PC, pyruvate carboxylase; MCC/PCC, methylcrotonyl-CoA carboxylase/propionyl-CoA carboxylase).

Notably, the pattern of biotinylated proteins generated by Sec61b-TurboID in the culture supernatant was clearly different from that of whole cell lysate, which is expected as ER-resident proteins and secretory proteins differ in composition (FIG. 7).

Figure 8:
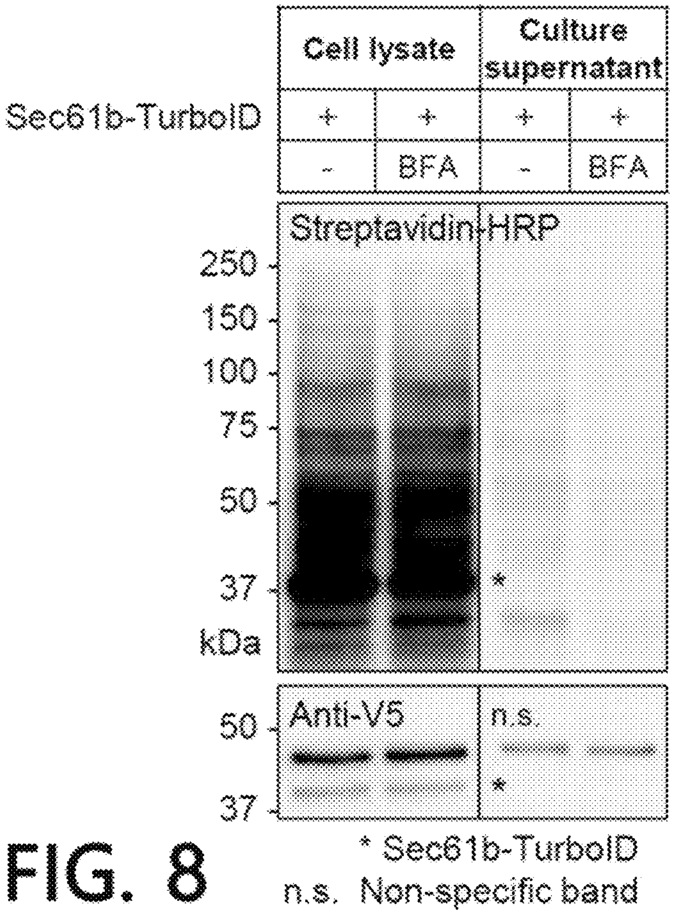
FIG. 8 shows the effect of Brefeldin A (BFA) on the secretion of biotinylated proteins in HepG2 cells transfected with Sec61b-TurboID expression plasmid.

To further confirm the secretory pathway origin of Sec61b-TurboID biotinylated proteins, we treated HepG2 cells expressing Sec61b-TurboID with Brefeldin A (BFA), an inhibitor of ER to Golgi protein transport, and observed a uniform reduction in the amount of biotinylated proteins detected in the culture supernatant (FIG. 8).

Taken together, these data indicate that catalytically active Sec61b-TurboID is expressed and faithfully retained in the ER-lumen, a necessary property for in vivo applications that require efficient and accurate labeling of tissue-specific secretory proteins.

Figure 9:
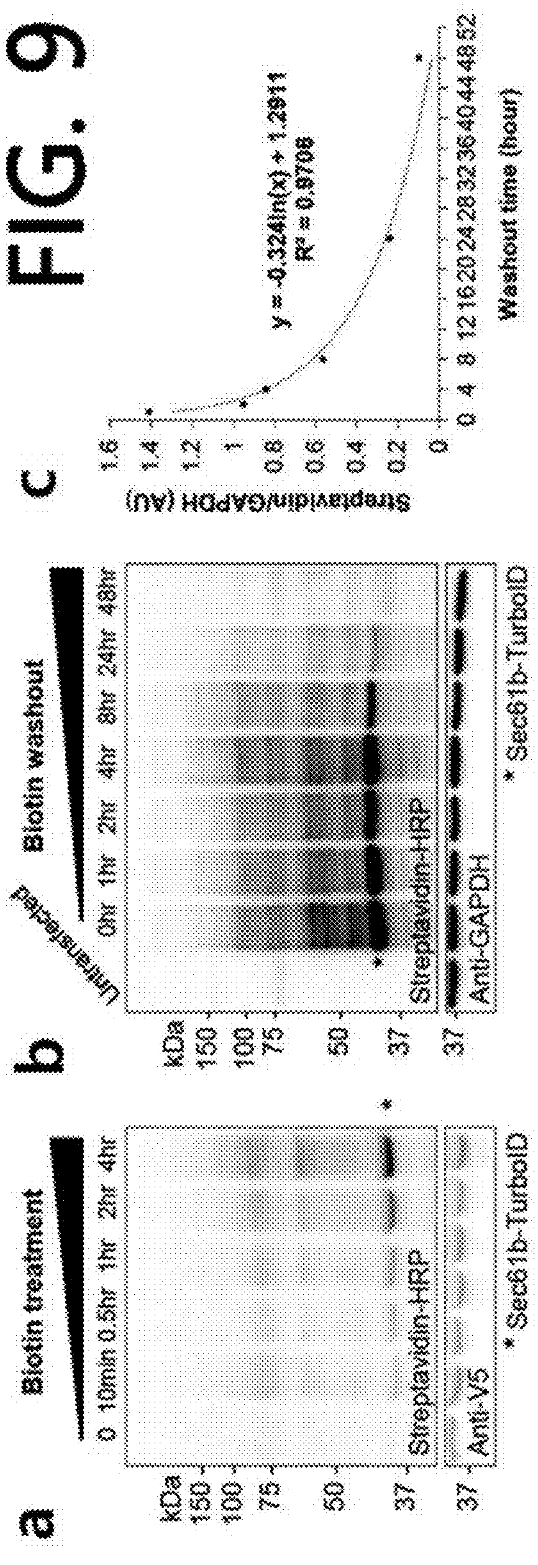
FIG. 9 at a is the time course blot result for a biotin-labeled protein (Streptavidin-HRP) in the cell lysates of HepG2 cells transfected with Sec61b-TurboID expression plasmid.

Labeling kinetics determined by biotin treatment time course studies indicate that Sec61b-TurboID efficiently labels secretory proteins in HepG2 cells by 10 min with increased labeling up to 4 hr (FIG. 9 at a). Conversely, biotin washout time course studies indicate that Sec61b-TurboID labeled secretory proteins are largely sustained for 8 hr (FIG. 9 at b and c). Therefore, Sec61b-TurboID can efficiently label classical secretory proteins in a biotin-dependent manner indicating compatibility with kinetic studies such as classical pulse-chase labeling analyses.

Example 2. Confirmation of Labeling of Secretory Proteins in Tumor In Vivo

First, all animal experiments performed in this example were approved by the KAIST Institutional Animal Care and Use Committee. 10-week-old C57BL/6J or Balb/c male mice were used for all animal experiments. Mice were maintained on a 12-hour light-dark cycle in a climate-controlled specific pathogen-free facility within the KAIST Laboratory Animal Resource Center. Unlimited amounts of standard diet (Envigo, 2018S) and water were provided, and tissues were dissected and fixed for histological analysis or flash frozen in liquid nitrogen until further analysis.

2-1. Transplantation of Cancer Cell Lines

After culturing LLC cells or C26 cells, $3\times10^6$ cells were isolated by centrifugation. After washing twice with PBS, 200 μL of PBS was used to prepare a cell solution. After respiratory anesthesia of mice using isoflurane, the cell solution was injected subcutaneously with a syringe. After 18 to 22 days, the mice were euthanized and the resulting tumor was isolated.

2-2. In Vivo Biotin Labeling and Preparation of Protein Samples

A 24 mg/mL biotin stock was prepared in DMSO. A vehicle (10% DMSO in PBS) or biotin solution (2.4 mg/mL) was filtered through a 0.2 μm PES syringe filter and infused at 10 μL/g (24 mg/kg) by intraperitoneal injection daily for 14 consecutive days. Biotin was not administered on the last day to minimize residual biotin in the blood. Blood samples were taken by cardiac puncture, and plasma was isolated in BD Microtainer® blood collection tubes (BD, 365985). Tissues were lysed and homogenized in RIPA buffer using an Xpert Protease Inhibitor Cocktail (GenDEPOT, P3100-010) by a FastPrep-24™ bead homogenizer (MP Biomedicals). The lysate was centrifuged 3 times at 16,000 g for 20 minutes at 4° C., and the supernatant was collected and clarified. The clear supernatant was used for western blot and the protein concentration was determined by BCA analysis.

Figure 10:
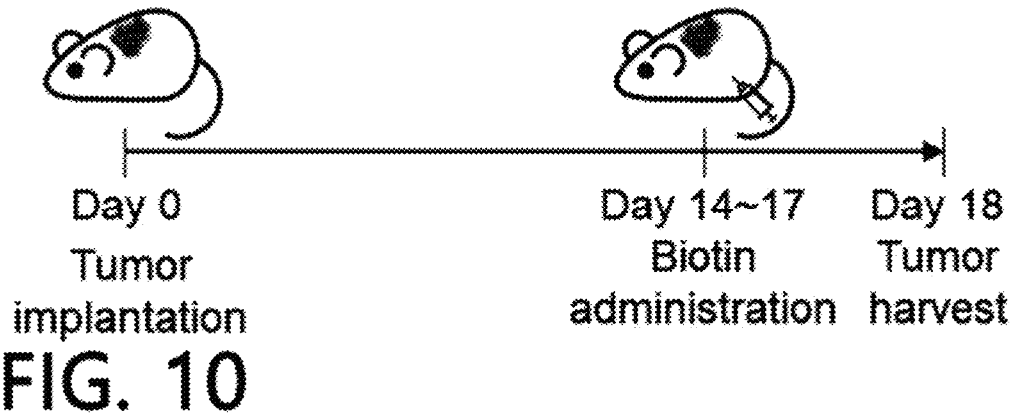
FIG. 10 is a mimetic diagram showing an experimental plan for tumor generation through the transplantation of LLC cells expressing Sec61b-TurboID.
Figure 11:
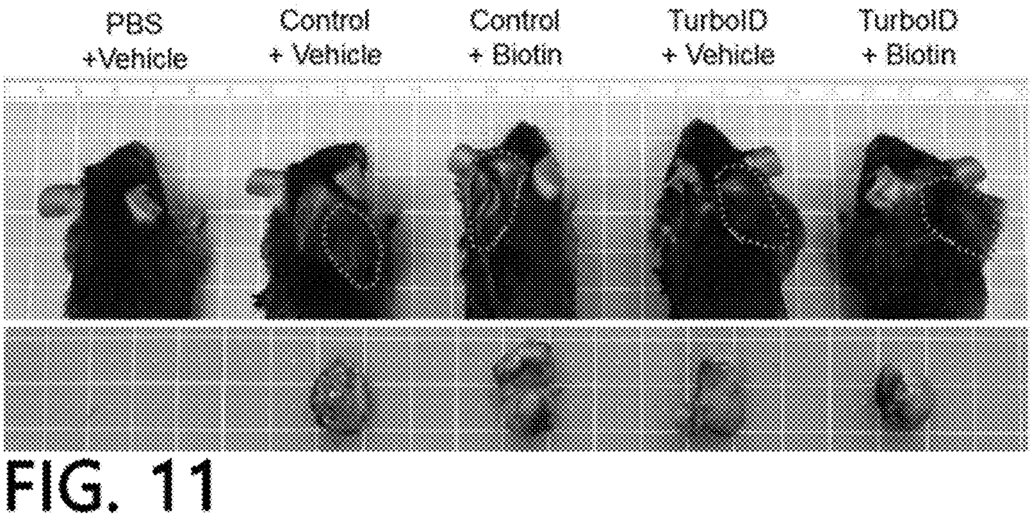
FIG. 11 is an image of mice in which tumors were generated after xenografting cells expressing Sec61b-TurboID into the mice and excised tumors.

It was confirmed whether a cancer cell line expressing Sec61B-TurboID was generated as a tumor in the mouse body. FIG. 10 is a plan of an experiment for inducing tumor formation by transplanting an LLC cell line into mice, and as a result of this experiment, it was confirmed that the tumor was generated well as shown in FIG. 11. Compared with the control group, the expression of SEC61B-TurboID did not differ significantly in generating tumors.

FIG. 12 confirms the biotin labeling efficiency by SEC61B-TurboID in LLC tumors in vivo. It was confirmed that various proteins were labeled with biotin when Sec61B-TurboID was expressed and biotin was administered. That is, it was confirmed that the labeling of secretory proteins by Sec61B-TurboID works well not only in the cell line but also in vivo.

Example 3. Confirmation of Location Information of Secretory Proteins in Colon Cancer Cells (C26 Cell)

The endoplasmic reticulum membrane protein-biotin ligase (Sec61b-TurboID) prepared in Example 1 was used to confirm the secretory proteins of colon cancer cells. C26 colon cancer cells were used as the cells, and the C26 cells are well known as colon cancer cells that induce sarcopenia.

First, the C26 cells expressing Sec61b-TurboID prepared in the above example were xenografted into mice, and then cancer was induced. The cancer-induced mice were weighed once a day over 22 days, and the results are shown in FIGS. 13 and 14 together with a control group (PBS).

Figure 13:
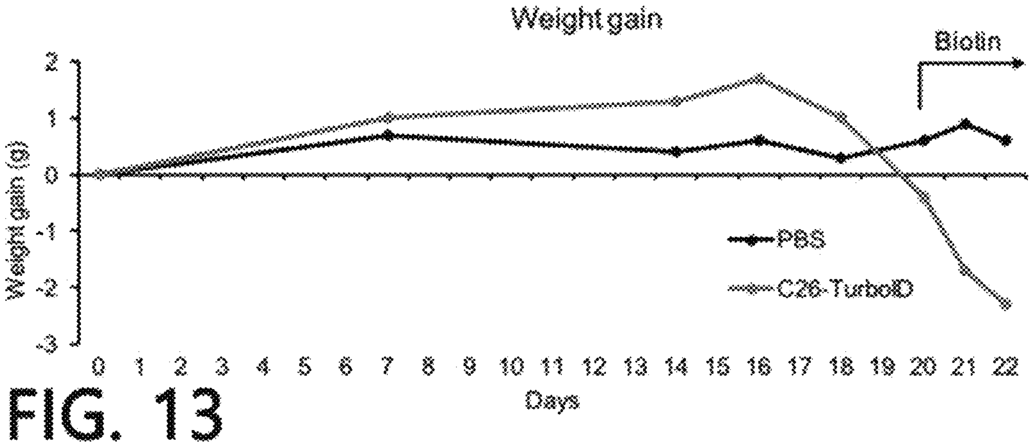
FIG. 13 is a graph showing the phenomenon of cancer cachexia after the xenotransplantation of cells expressing Sec61b-TurboID into mice according to an exemplary embodiment of the present invention.
Figure 14:
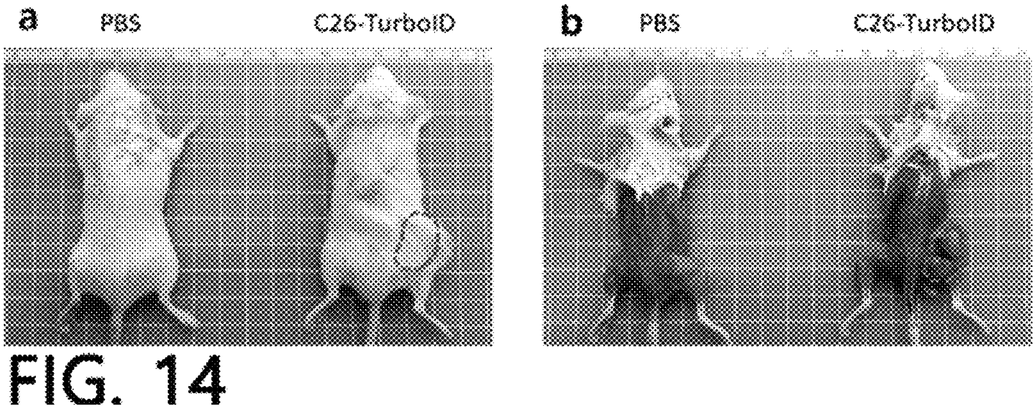
FIG. 14 shows images of mice in which tumors were generated after xenografting the cells expressing Sec61b-TurboID into mice according to an exemplary embodiment of the present invention.

As shown in the graph of FIG. 13, when cancer was induced by transplanting C26 cells expressing Sec61b-TurboID according to the present invention into mice, it was confirmed that the weight of the mice decreased over time. In particular, in the case of the mouse anatomical image of FIG. 14, when the C26 cells expressing Sec61b-TurboID according to the present invention were xenografted into mice, tumor formation was observed.

Figure 15:
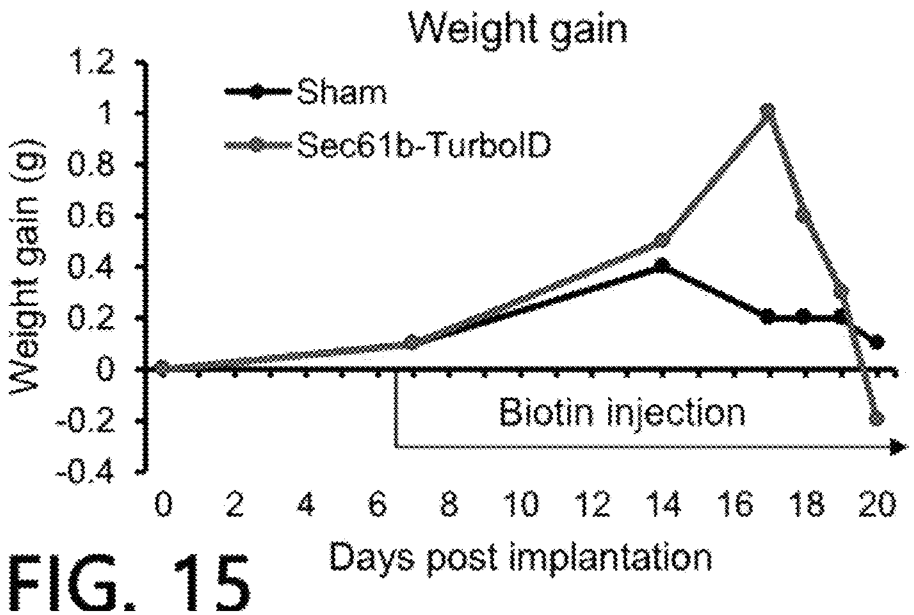
FIG. 15 is a graph showing the phenomenon of cancer cachexia by the transplantation of C26 cells expressing Sec61b-TurboID and a control group according to an exemplary embodiment of the present invention.

Next, in order to confirm the location information by selectively biotin-labeling secretory proteins in colon cancer cells, Sec61b-TurboID of the above example was introduced into C26 colon cancer cells through transfection. After introduction, it was verified through the graph of FIG. 15 and the Streptavidin-HRP western blot experiment that the secretory proteins secreted from the C26 cells were selectively biotinylated by treatment with biotin (FIG. 16). When biotin was administered after transplanting the C26 cell line expressing Sec61B-TurboID, various secretory proteins of the biotinylated C26 cells were separated into Streptavidin beads after trypsin digestion, and the biotin-modified peptide of the lysine group (K+226 Da) was selectively subjected to mass spectrometry to selectively identify only the biotin-labeled secretory protein Sec61b-TurboID according to the present invention. That is, it was confirmed that the labeling of the secretory proteins by Sec61bB-TurboID works well in the C26 tumor in vivo.

Example 4. Identification of Secretory Proteins in C26 Cell Line 4-1. Preparation of Peptide Samples and Concentration of Biotinylated Peptides Protein samples were denatured by transferring 500 μL of 8 M urea in 50 mM ammonium bicarbonate for 1 hour at 37° C., followed by reduction of disulfide bonds with 10 mM dithiothreitol for 1 hour at 37° C. The reduced thiol groups in the protein samples were alkylated with 40 mM iodoacetamide for 1 hour at 37° C. in the dark. The resulting alkylated samples were diluted 8 times with 50 mM ABC and subjected to trypsin treatment at 2% (w/w) trypsin concentration under a concentration of 1 mM $CaCl_2$ in a thermo mixer (37° C. and 500 rpm) overnight. The samples were centrifuged at 10,000 g for 3 minutes to remove insoluble matter. In addition, 150 μL of Streptavidin beads (Pierce, 88816) per repetition were washed 4 times with 2 M urea in TBS and combined with individually digested samples. The combined samples were spun at room temperature for 1 hour. The flow-through fraction was maintained, and the beads were washed twice with 2 M urea in 50 mM ABC and finally washed with pure water in a new tube. The linked biotinylated peptide was eluted with 400 μL of 80% acetonitrile containing 0.2% TFA and 0.1% formic acid after mixing and heating the bead slurry at 60° C. Each eluate was collected in a new tube, and the elution process was repeated at least 4 times. The linked eluted fractions were dried using a Vacufuge® and reconstituted with 10 μL of 25 mM ABC for further analysis by LC-MS/MS.

4-2. LC-MS/MS Analysis

The concentrated samples were analyzed with an Orbitrap Fusion Lumos mass spectrometer (Thermo Scientific) coupled with a NanoAcquity UPLC system (Waters, Milford) in a sensitive acquisition setup. Precursor ions were obtained in the m/z 400 to 1600 range with 120K resolution, and precursor separation for MS/MS analysis was performed at 1.4 Th. High-energy collision dissociation (HCD) with 30% collision energy was used for sequencing with a target value of 1e5 ions determined by automatic gain control. The resolution of the acquired MS2 spectrum was set to 30 k at m/z 200 with a maximum injection time of 150 ms. The peptide sample was loaded onto a trap column (3 cm×150 μm id) via the backwash technique and separated into a 100 cm long analytical capillary column (75 μm id) packed in-house with 3 μm Jupiter C18 particles (Phenomenex, Torrance). The long analytical column was placed in a 95 cm-long dedicated column heater (Analytical Sales and Services) controlled to a temperature of 45° C. The NanoAcquity UPLC system was operated at a flow rate of 300 nL/min over 2 hours with a linear gradient ranging from 95% solvent A (0.1% formic acid and $H_2O$) to 40% of solvent B (0.1% formic acid and acetonitrile).

4-3. LC-MS/MS Data Processing and Confirmation of Biotinylated Peptides

All MS/MS datasets were first subjected to peak peaking and mass recalibration processed with RawConverter (http://fields.scripps.edu/rawconv) and MZRefinery (https://omics.pnl.gov/software/mzrefinery) software. Afterwards, these were searched with the MS-GF+25 algorithm (v.9979) at 10 ppm precursor ion mass tolerance against the UniProt reference secretory protein database (55,152 entries, mice). The following search parameters were applied: anti-trypsin degradation, fixed carbamido methylation to cysteine, dynamic oxidation of methionine and dynamic biotinylation of lysine residues (delta 284 single isotope mass: +226.07759 Da). The false discovery rate (FDR) was set at <0.5% for non-overlapping labeled peptide levels and protein FDR results were close to or less than 1%. MS/MS spectral annotation for biotinylated peptides was performed using LcMsSpectator software 287 (https://omics.pnl.gov/software/lcmsspectator).

For mass spectrometry of biotin-labeled secretory proteins in the C26 cell line, biotin was treated to the C26 cell line stably expressing Sec61B-TurboID, and as shown in FIG. 17, it was verified through a Streptavidin-HRP western blot experiment that the proteins secreted from C26 cells were selectively biotin-labeled.

These biotinylated C26 secretory proteins were separated into Streptavidin beads after trypsin digestion, and afterwards, by selective mass spectrometry of only the lysine biotin-modified peptide (K+226 Da), it was possible to selectively identify only the secreted proteins to which Sec61B-TurboID had attached the biotin group.

There are a total of 421 types of secretory proteins from C26 cells that were revealed using the above method, and among these, proteins with functions associated with sarcopenia are shown in Table 1 below.

TABLE 1

| Secretory proteins of C26 cell | Functions |
|---|---|
| Serpinf1 | It is known to play an anti-geronic role and is also known to play an important role in bone formation. |
| Poglut1 | It is known as a growth factor and is known to regulate Notch signaling. This is a pathway that regulates cell proliferation or death, and is expected to be associated with the proliferation or death of muscle cells. |

TABLE 1-continued

| Secretory proteins of C26 cell | Functions |
|---|---|
| Igfbp4 | It is known as a growth factor and is known to inhibit the effects of IGF-I on cell proliferation and differentiation. It is also expected to have an inhibitory effect on cell proliferation and differentiation of muscle tissue. |
| Ctsl, Nucb | It is known as a lysosomal protein. It has the potential to interfere with muscle tissue growth due to its direct protease effect on muscle tissue proteins. |

Example 5. Confirmation of Labeling of Secretory Proteins at In Vivo Level

We applied our method, named iSLET, in situ Secretory protein Labeling via ER-anchored TurboID, in live mice to demonstrate its in vivo functionality.

5-1. Animals

All animal experiments were approved by the KAIST institutional animal care and use committee. 10-week-old C57BL/6J (JAX, 000664) male mice were used for all animal experiments. Mice were maintained under a 12 h light-dark cycle in a climate-controlled specific pathogen-free facility within the KAIST Laboratory Animal Resource Center. Standard chow diet (Envigo, 2018S) and water were provided ad libitum. Tissues were dissected and fixed for histological analysis or snap-frozen in liquid nitrogen until further analysis.

5-2. Adenovirus Production and Infection

Sec61b-TurboID was cloned to the pAdTrack-CMV shuttle vector by KpnI and NotI digestion. The cloned shuttle vector was linearized with PmeI and transformed to BJ5183-AD-1 cells. The recombinant adenoviral plasmid was linearized with PacI and transfected to 293AD cells. Stepwise amplification of adenovirus was performed, and adenovirus was concentrated by ViraBind™ adenovirus purification kit (Cell Biolabs, VPK-100). Adenovirus titer was measured by counting GFP-positive cells 24 h after infection with serial dilution. For adenoviral infection, cells were plated at $2.5\times10^5$ cells/well in a 6-well culture plate. 24 h after plating, cells were infected with $1.25\times10^6$ adenoviral GFP or Sec61b-TurboID particles.

5-3. In Vivo Biotin Labeling and Protein Sample Preparation

Approximately $10^8$ adenoviral GFP or Sec61b-TurboID particles were injected to mice via the tail vein. 24 mg/ml biotin stock was prepared in DMSO. Vehicle (10% DMSO in PBS) or Biotin solution (2.4 mg/mL) was filtered through a 0.22 µm PES syringe filter and injected 10 µL/g (24 mg/kg) by daily intraperitoneal injection for 3 consecutive days. Biotin was not administered on the last day to minimize residual biotin in blood. Blood samples were obtained by cardiac puncture and plasma was separated in BD Microtainer® blood collection tubes (BD, 365985). Tissues were lysed and homogenized in RIPA buffer with Xpert Protease Inhibitor Cocktail (GenDEPOT, P3100-010) by FastPrep-24™ bead homogenizer (MP Biomedicals). Lysates were clarified by three rounds of centrifugation at 16,000 g for 20 min at 4° C. and supernatant collection. The clear supernatant was used for western blots. Protein concentrations were determined by BCA assay.

5-4. Histological Analysis

Mouse livers were fixed in 10% neutral buffered formalin (Sigma, HT501128) for 24 hr and embedded in paraffin by an automated tissue processor (Leica, TP1020). 4 µm-thick tissue sections were obtained, deparaffinized, rehydrated, and stained with hematoxylin and eosin.

As expected, and consistent with results obtained from the culture supernatant of Sec61b-TurboID-expressing cell lines, endogenous biotinylated proteins were not detected in plasma samples from liver iSLET mice (FIG. 18B). Thus, we could unambiguously detect TurboID-dependent biotinylated liver secretory proteins in the plasma without any background (FIG. 18B). Interestingly, the pattern of biotinylated proteins secreted from the liver in vivo was unique and clearly distinct from that of the secretory protein profile of hepatocyte cell lines, human HepG2 and mouse AML12 (FIG. 18C). These data confirm the in vivo functionality of Sec61b-TurboID in liver tissues as demonstrated by the detection of biotinylated secretory protein species in the plasma of liver iSLET mice.

Figure 19:
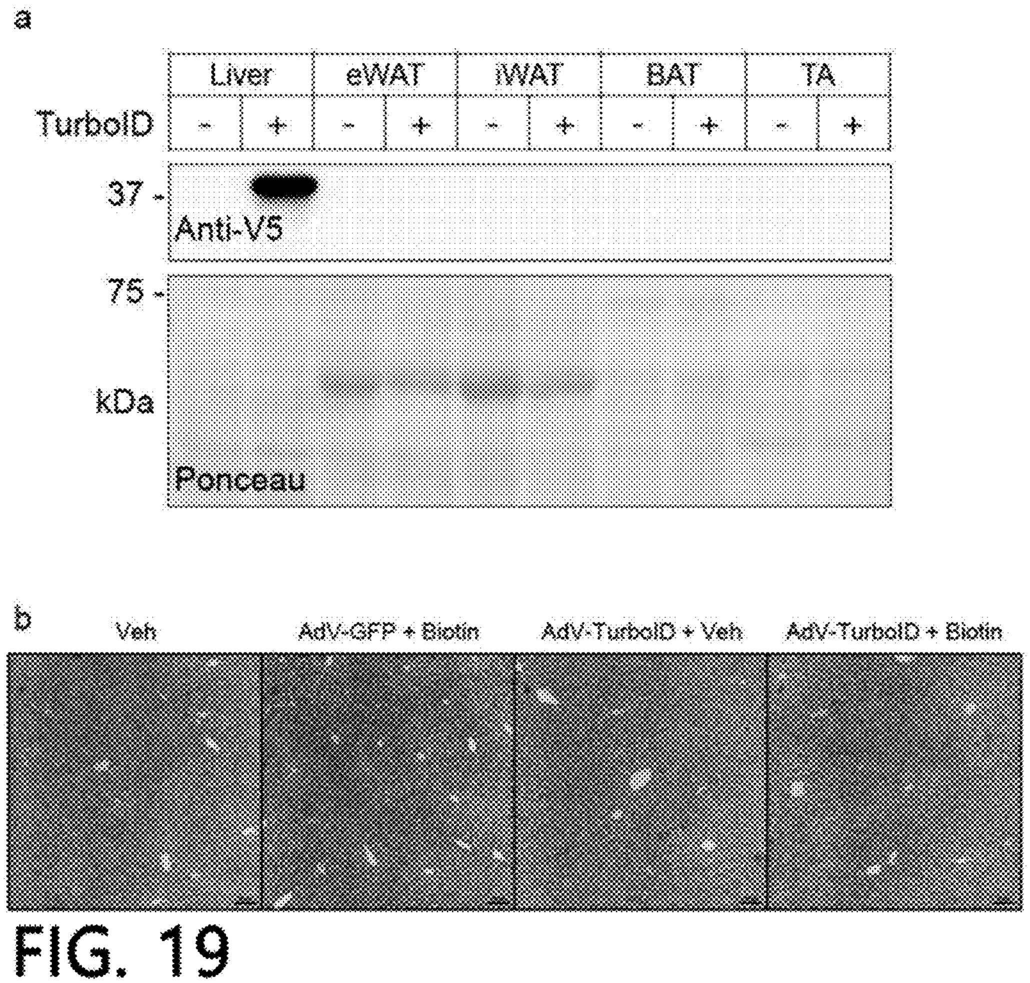
FIG. 19 shows the expression of liver-specific Sec61-TurboID and liver tissue.

Four days after Sec61b-TurboID adenovirus delivery, we observed that Sec61b-TurboID expression was restricted to the liver tissues examined by histological analysis did not reveal any obvious adverse effects due to adenoviral overexpression of TurboID and biotin administration (FIGS. 19A and 19B).

We next performed proteomic analysis of biotinylated proteins enriched from liver iSLET mice plasma via liquid chromatography and tandem mass spectrometry (LC-MS/MS). Here, we followed a previously optimized mass spectrometric identification workflow (Lee, S. Y. et al. ACS Cent. Sci. 2, 506-516 (2016), Lee, S. Y. et al. J. Am. Chem. Soc. 139, 3651-3662 (2017)) which provides direct evidence for biotinylated peptides identified by the mass shift of the biotinylated lysine residue.

5-5. Peptide Sample Preparation and Enrichment of Biotinylated Peptides

Plasma samples were first subjected to buffer exchange with PBS to completely remove residual free biotin via 10 k MWCO filtration for three times. The biotin depleted plasma samples were transferred and denatured with µL of 8 M urea in 50 mM ammonium bicarbonate for 1 h at 37° C., and followed by reduction of disulfide bonds with 10 mM dithiothreitol for 1 h at 37° C. The reduced thiol groups in the protein samples were subsequently alkylated with 40 mM iodoacetamide for 1 h at 37° C. in the dark. The resulting alkylated samples were diluted eight times using 50 mM ABC and subjected to trypsinization at 2% (w/w) trypsin concentration under 1 mM CaCl2 concentration for overnight in Thermomixer (37° C. and 500 rpm). Samples were centrifuged at 10,000 g for 3 min to remove insoluble material. Then, 150 µL of streptavidin beads (Pierce, 88816) per replicate was washed with 2 M urea in TBS four times and combined with the individual digested sample. The combined samples were rotated for 1 h at room temperature. The flow-through fraction was kept, and the beads were washed twice with 2 M urea in 50 mM ABC and finally with pure water in new tubes. The bound biotinylated peptides were eluted with 400 µL of 80% acetonitrile containing 0.2% TFA and 0.1% formic acid after mixing and heating the bead slurry at 60° C. Each eluate was collected into a new tube. The elution process was repeated four more times. Combined elution fractions were dried using Vacufuge® (Eppendorf) and reconstituted with 10 µL of 25 mM ABC for further analysis by LC-MS/MS.

5-6. LC-MS/MS Analysis of Enriched Biotinylated Peptides

The enriched samples were analyzed with an Orbitrap Fusion Lumos mass spectrometer (Thermo Scientific) coupled with a NanoAcquity UPLC system (Waters, Milford) in sensitive acquisition settings. Precursor ions were acquired at a range of m/z 400-1600 with 120 K resolving power and the isolation of precursor for MS/MS analysis was performed with a 1.4 Th. Higher-energy collisional dissociation (HCD) with 30% collision energy was used for sequencing with a target value of 1e5 ions determined by automatic gain control. Resolving power for acquired MS2 spectra was set to 30 k at m/z 200 with 150 ms maximum injection time. The peptide samples were loaded onto the trap column (3 cm×150 μm i.d) via the back-flushing technique and separated with a 100 cm long analytical capillary column (75 μm i.d.) packed in-house with 3 μm Jupiter C18 particles (Phenomenex, Torrance). The long analytical column was placed in a dedicated 95 cm long column heater (Analytical Sales and Services) regulated to a temperature of 45° C. NanoAcquity UPLC system was operated at a flow rate of 300 nL/min over 2 h with a linear gradient ranging from 95% solvent A ($H_2O$ with 0.1% formic acid) to 40% of solvent B (acetonitrile with 0.1% formic acid).

5-7. LC-MS/MS Data Processing and the Identification of Biotinylated Peptides

All MS/MS datasets were first subject to peak picking and mass recalibration processed with RawConverter23 (http://fields.scripps.edu/rawconv) and MZRefinery24 (https://omics.pnl.gov/software/mzrefinery) software, respectively, and then were searched by MS-GF+25 algorithm (v.9979) at 10 ppm precursor ion mass tolerance against the UniProt reference proteome database (55,152 entries, Mouse). The following search parameters were applied: semi-tryptic digestion, fixed carbamidomethylation on cysteine, dynamic oxidation of methionine, and dynamic biotinylation of a lysine residue (delta monoisotopic mass: +226.07759 Da). The False discovery rate (FDR) was set at <0.5% for non-redundantly labeled peptide level and the resulting protein FDR was near or less than 1%. MS/MS spectrum annotation for biotinylated peptides was carried out using LcMsSpectator software (https://omiCs.pnl.gov/software/lcmsspectator).

TABLE 2

| | | Protein species retrieved by UniProt Retrieve/ID mapping | Adeno-Sec61b-TurboID + Biotin (Replicate 1) | | Adeno-Sec61b-TurboID + Biotin (Replicate 2) | |
|---|---|---|---|---|---|---|
| UniProt accession | Gene name | Protein name (Both detected, non-redundant peptide >1) | Non-redundant peptide | PSM | Non-redundant peptide | PSM |
| P07724 | Alb | Albumin | 43 | 134 | 45 | 161 |
| Q61838 | Pzp | Pregnancy zone protein | 20 | 43 | 21 | 56 |
| Q921I1 | Tf | Serotransferrin | 21 | 42 | 28 | 56 |
| A0A0R4J0I1 | Serpina3k | Serine protease inhibitor A3K | 16 | 46 | 13 | 33 |
| P28665 | Mug1 | Murinoglobulin-1 | 13 | 19 | 24 | 33 |
| E9PV24 | Fga | Fibrinogen alpha chain | 12 | 18 | 16 | 26 |
| Q00623 | Apoa1 | Apolipoprotein A-I | 7 | 13 | 10 | 21 |
| Q8VCM7 | Fgg | Fibrinogen gamma chain | 9 | 15 | 11 | 19 |
| Q91X72 | Hpx | Hemopexin | 7 | 15 | 7 | 14 |
| P22599 | Serpina1b | Alpha-1-antitrypsin 1-2 | 3 | 3 | 9 | 13 |
| P01027 | C3 | Complement C3 | 5 | 6 | 6 | 9 |
| Q61147 | Cp | Ceruloplasmin | 3 | 4 | 5 | 6 |
| O08677 | Kng1 | Kininogen-1 | 3 | 4 | 3 | 5 |
| Q61646 | Hp | Haptoglobin | 2 | 2 | 3 | 7 |
| Q8K0E8 | Fgb | Fibrinogen beta chain | 4 | 4 | 4 | 5 |
| P21614 | Gc | Vitamin D-binding protein | 2 | 3 | 3 | 5 |
| P19221 | F2 | Prothrombin | 2 | 2 | 3 | 4 |
| P20918 | Plg | Plasminogen | 2 | 2 | 4 | 4 |
| P23953 | Ces1c | Carboxylesterase 1C | 2 | 3 | 2 | 3 |
| P32261 | Serpinc1 | Antithrombin-III | 2 | 3 | 2 | 3 |
| Q8K182 | C8a | Complement component C8 alpha chain | 2 | 2 | 2 | 4 |
| P06909 | Cfh | Complement factor H | 1 | 1 | 3 | 3 |
| Q9ESB3 | Hrg | Histidine-rich glycoprotein | 1 | 2 | 2 | 2 |
| A6X935 | Itih4 | Inter alpha-trypsin inhibitor, heavy chain 4 | 1 | 1 | 2 | 2 |
| Q03734 | Serpina3m | Serine protease inhibitor A3M | 2 | 2 | 1 | 1 |
| Q61247 | Serpinf2 | Alpha-2-antiplasmin | 1 | 1 | 2 | 2 |
| Q61703 | Itih2 | Inter-alpha-trypsin inhibitor heavy chain H2 | 1 | 1 | 2 | 2 |

TABLE 3

| | | SignalP 5.0 | Human Protein Atlas (www. proteinatlas.org) | | | Ex vivo secretome of |
|---|---|---|---|---|---|---|
| UniProt accession | Gene name | Signal Peptide (Sec/SPI) Likelihood | Elevated expression in Liver? | Predicted secretory protein? | Plasma protein? | primary hepatocyte Peptide count |
| P07724 | Alb | 0.993 | Yes | Yes | Yes | 145 |
| Q61838 | Pzp | 0.997 | Yes | Yes | Yes | 6 |

TABLE 3-continued

| UniProt accession | Gene name | SignalP 5.0<br>Signal Peptide (Sec/SPI) Likelihood | Human Protein Atlas (www. proteinatlas.org)<br>Elevated expression in Liver? | Predicted secretory protein? | Plasma protein? | Ex vivo secretome of primary hepatocyte Peptide count |
|---|---|---|---|---|---|---|
| Q921I1 | Tf | 0.998 | Yes | Yes | Yes | 75 |
| A0A0R4J0I1 | Serpina3k | 0.981 | Yes (SERPINA3) | Yes (SERPINA3) | Yes (SERPINA3) | 21 |
| P28665 | Mug1 | 0.949 | — | — | — | 6 |
| E9PV24 | Fga | 0.995 | Yes | Yes | Yes | Not detected |
| Q00623 | Apoa1 | 0.997 | Yes | Yes | Yes | 9 |
| Q8VCM7 | Fgg | 0.999 | Yes | Yes | Yes | 7 |
| Q91X72 | Hpx | 0.988 | Yes | Yes | Yes | 17 |
| P22599 | Serpina1b | 0.988 | Yes (SERPINA1) | Yes (SERPINA1) | Yes (SERPINA1) | 23 |
| P01027 | C3 | 0.988 | Yes | Yes | Yes | 36 |
| Q61147 | Cp | 0.994 | Yes | Yes | Yes | 29 |
| O08677 | Kng1 | 0.999 | Yes | Yes | Yes | 17 |
| Q61646 | Hp | 0.997 | Yes | Yes | Yes | 22 |
| Q8K0E8 | Fgb | 0.999 | Yes | Yes | Yes | 12 |
| P21614 | Gc | 0.996 | Yes | Yes | Yes | 40 |
| P19221 | F2 | 0.900 | Yes | Yes | Yes | 11 |
| P20918 | Plg | 0.993 | Yes | Yes | Yes | 1 |
| P23953 | Ces1c | 0.979 | — | — | — | 10 |
| P32261 | Serpinc1 | 0.988 | Yes | Yes | Yes | 6 |
| Q8K182 | C8a | 0.997 | Yes | Yes | Yes | Not detected |
| P06909 | Cfh | 0.999 | Yes | Yes | Yes | 1 |
| Q9ESB3 | Hrg | 0.998 | Yes | Yes | Yes | Not detected |
| A6X935 | Itih4 | 0.960 | Yes | Yes | Yes | Not detected |
| Q03734 | Serpina3m | 0.967 | Yes (SERPINA3) | Yes (SERPINA3) | Yes (SERPINA3) | Not detected |
| Q61247 | Serpinf2 | 0.979 | Yes | Yes | Yes | 5 |
| Q61703 | Itih2 | 0.998 | Yes | Yes | Yes | 16 |

Figure 20:
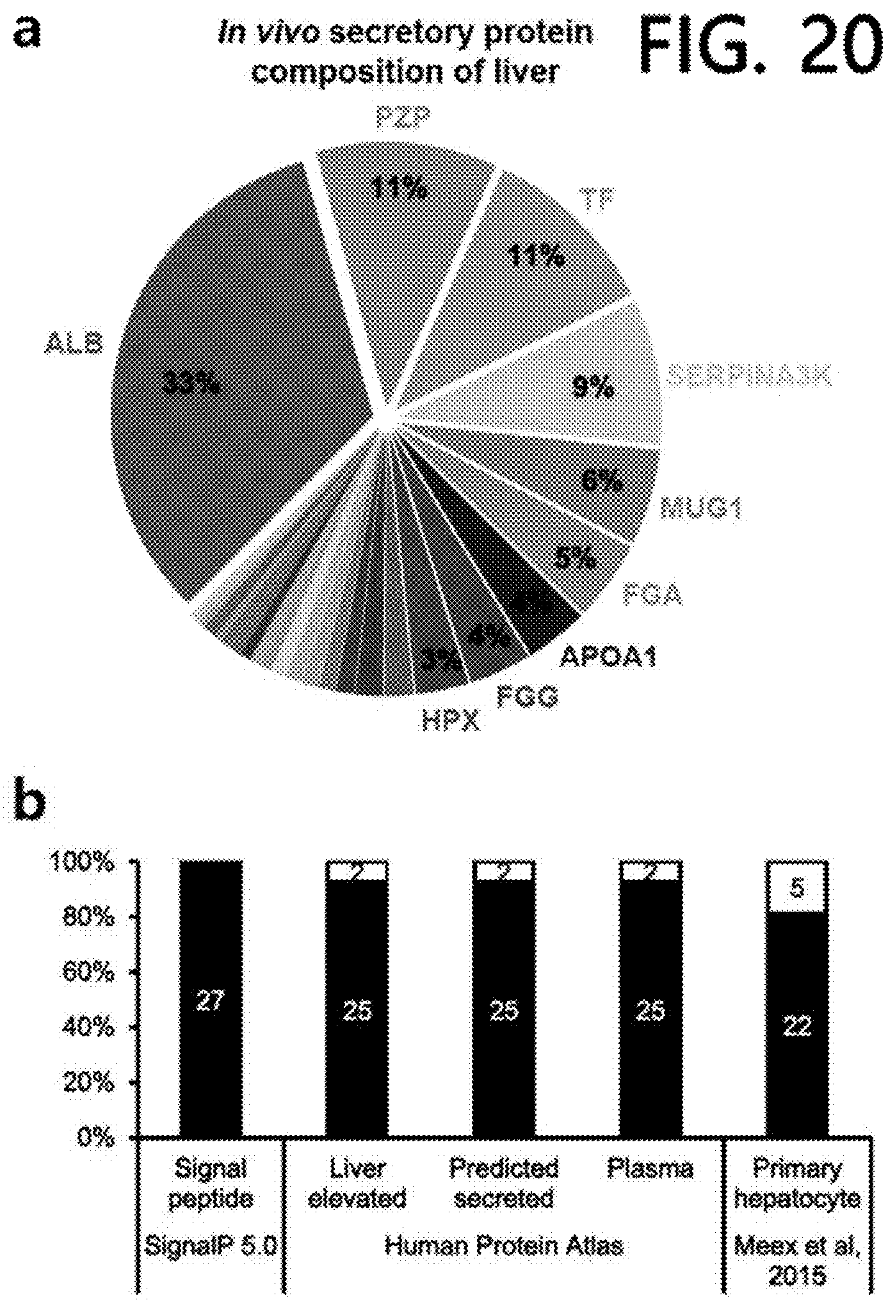
FIG. 20 at a shows the relative abundance of biotinylated secretory proteins detected in the plasma of liver iSLET mice (ALB, serum albumin; PZP, pregnancy zone protein; TF, serotransferrin; SERPINA3K, serine protease inhibitor A3k; MUG1, murinoglobulin-1; FGA, fibrinogen alpha chain; APOA1, apolipoprotein A-I; FGG, fibrinogen gamma chain; HPX, hemopexin)
Figure 21:
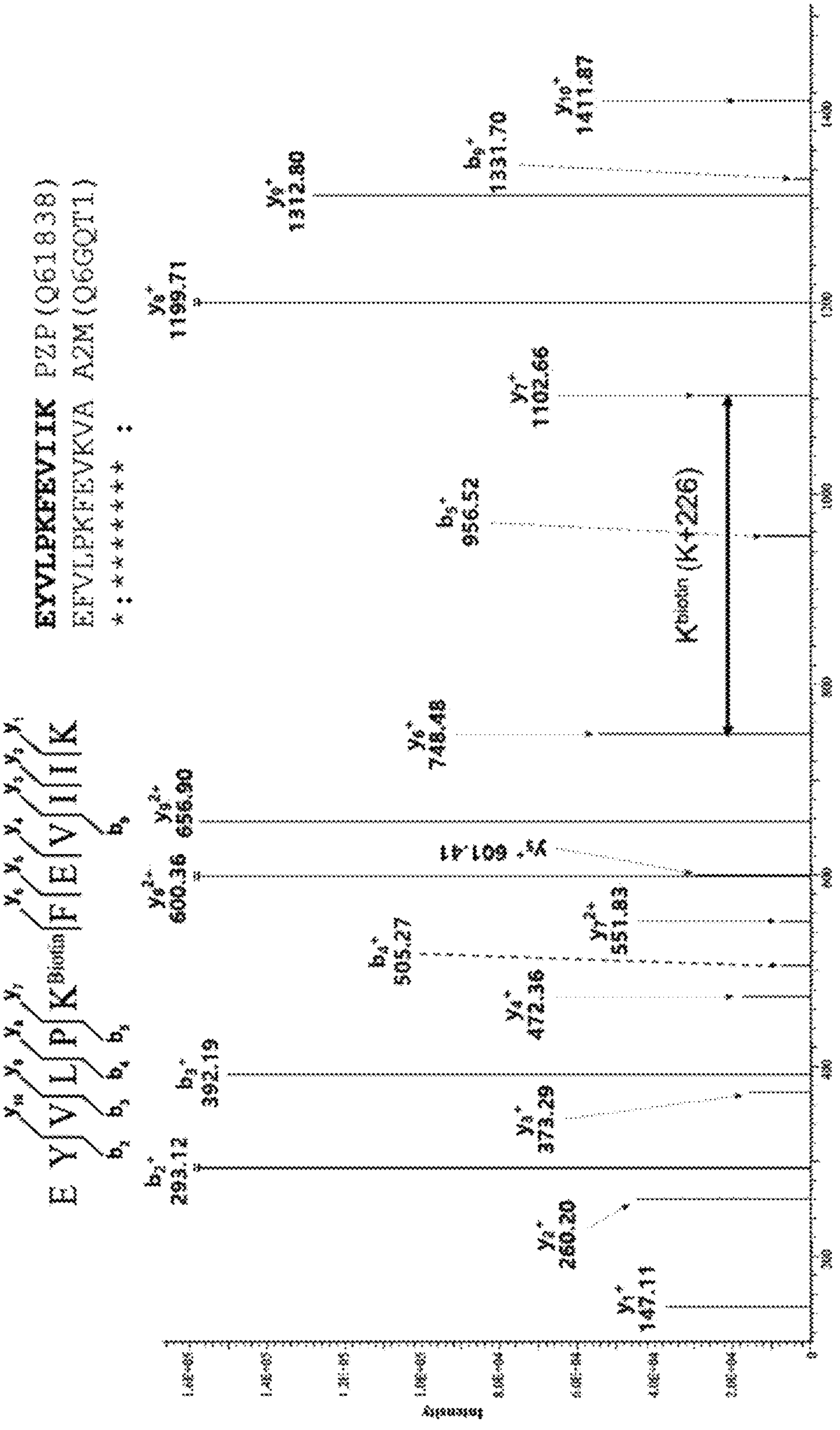
FIG. 21 shows representative serial mass spectra of biotinylated PZP peptides. The mass of the biotinylated lysine residue is 354 Da (K+ 226 Da). The arrow indicates the mass shift of biotinylated lysine residues in biotinylated PZP peptide (Q61838).

From the LC-MS/MS data, 27 biotinylated proteins were identified in Sec61b-TurboID mouse plasma (FIG. 20 at b and Table 2). Representative MS/MS spectra of the biotinylated peptides from our optimized workflow show the accurate identification of biotinylated residues (FIG. 21 and Table 3).

Serum albumin (ALB) was the most abundant biotinylated protein detected from liver iSLET mice plasma samples (FIG. 20 at a). Interestingly, the second most abundant protein was pregnancy zone protein (PZP, Q61838) (FIG. 20 at a), which is also annotated under the alias alpha-2-macroglobulin (A2M, Q6GQT1) in the UniProt database. However, Pzp and A2m are independent genes in the mouse genome, and the identified peptides in our analysis were a precise match to the sequence of PZP but not A2M (FIG. 21).

Signal peptide analysis for the biotinylated proteins with SignalP 5.0 revealed that all of the detected proteins contain signal peptides required for cotranslational transport to the ER-lumen (FIG. 20 at b). We found that 93% of the proteins identified are annotated as liver-enriched and predicted as secreted plasma proteins in the Human Protein Atlas database (FIG. 20 at b).

We next compared the secretory protein profiles from liver iSLET mice plasma with ex vivo secretome studies using primary hepatocytes. While a considerable fraction (81%) of proteins were common in both (FIG. 20 at b), fibrinogen gamma chain (FGA), complement component C8 alpha chain (C8A), histidine-rich glycoprotein (HRG), inter alpha-trypsin inhibitor, heavy chain 4 (ITIH4) and serine protease inhibitor A3M (SERPINA3M) were only detected in mouse plasma of liver iSLET mice (Table 2). Taken together, our results indicate that the liver-specific secretory protein profiles obtained from liver iSLET mice are conserved in human and more accurately reflect in vivo physiology compared to conventional ex vivo secretome analyses.

Example 6. Confirmation of Labeling of Secretory Proteins in Insulin Resistance Model We next applied iSLET to characterize secreted proteomes associated with in vivo pathophysiology in which endocrine signals play an important role such as insulin resistance. S961 is an insulin receptor antagonist that induces systemic insulin resistance.

For the acute insulin resistance model, in the process of Example 5.3 in vivo biotin labeling and protein sample preparation, S961 (100 nmol/kg, Novo Nordisk) was delivered by daily intraperitoneal injection for 8 consecutive days, 2 hours prior to daily biotin injection.

TABLE 4

| Protein | Reported function |
|---|---|
| AHSG | Increased in serum of diabetic human subjects Causes insulin resistance |
| FETUB | Increased in plasma of diabetic human subjects Causes impaired glucose metabolism |
| ITIH1 | Increased in serum of diabetic human subjects Causes impaired glucose metabolism |
| AFM | Associated with insulin resistance, prevalence and incidence of type 2 diabetes |
| APOH | Associated with metabolic syndrome in type 2 diabetic patients |

S691 administration to mice dramatically increased blood glucose confirming the insulin resistance state (FIG. 22 at b). Proteomic analysis of biotinylated proteins from vehicle (PBS) or S961 group plasma identified 30 and 47 protein species, respectively (FIG. 22 at c). Notably, 17 of the identified proteins were exclusively found in the S961 administered insulin resistant group. Among these proteins, many have been reported to play a role in the development of insulin resistance (Table 4).

Example 7. Detection of Adipose Tissue-Specific Secretory Proteins Using the Cre-LoxP System In order to use this system, transgenic mice into which LoxP-Stop-LoxP-Sec61b-TurboID was inserted were custom-made by CRISPR knock-in through Cyagen. For the insertion method, the LoxP-Stop-LoxP-Sec61b-TurboID cassette prepared by gene synthesis was injected together with gRNA and Cas9 mRNA targeting the Rosa26 gene into fertilized eggs of mice, and then successfully knocked-in mice were selected and produced. Adipose tissue-specific Cre mice (Adipoq-cre) were purchased from The Jackson Laboratory (#028020) and crossed with Sec61b-TurboID transgenic mice to produce adipose tissue-specific Sec61b-TurboID transgenic mice.

A 24 mg/mL biotin stock was prepared in DMSO for biotin administration. The biotin solution (PBS+10% biotin stock, 2.4 mg/mL) was filtered through a 0.2 μm PES syringe filter and injected at 10 μL/g (24 mg/kg) by intraperitoneal injection into 12-week-old mice daily for 4 consecutive days. Biotin was not administered on the last day to minimize residual biotin in the blood. The day after the last biotin administration, blood samples were collected by cardiac puncture, and plasma was isolated from the BD Microtainer® blood collection tube (BD, 365985). The protein concentration of the isolated plasma was determined by BCA analysis and then used for western blot. The biotin-labeled protein was detected using Streptavidin-HRP, and the total protein amount was confirmed by Ponceau staining.

As a result, as shown in FIG. 23, it was confirmed that the labeling of secretory proteins was possible specifically for the adipose tissue expressing Sec61b-TurboID. Although the adipose tissue-specific Cre was used in this Example, it can be seen that various tissue-specific secretory proteins may be detected when other tissue-specific Cre is used.

The description of the present invention described above is for illustration, and those of ordinary skill in the art to which the present invention pertains can understand that it can be easily modified into other specific forms without changing the technical spirit or essential features of the present invention. Therefore, it should be understood that the exemplary embodiments described above are illustrative in all respects and not restrictive. For example, each component described as a single type may be implemented in a dispersed form, and likewise, components described as distributed may also be implemented in a combined form.

The invention claimed is:

1. A method for identifying an intracellular secretory protein or tissue-specific secretory protein, comprising the steps of:

(a) expressing a fusion protein in cells or expressing the fusion protein tissue-specifically in a subject, wherein the fusion protein is a fusion protein in which an ER lumen targeting membrane protein and a biotin ligase are fused, wherein the biotin ligase comprises at least one selected from the group consisting of BioID and TurboID;

(b) obtaining a biotinylated protein or peptide from a sample of the cells or the subject; and (c) analyzing the protein or peptide to identify a secretory protein or peptide.

2. The method of claim 1, wherein step (a) treats biotin after expressing the fusion protein in cells or expressing the fusion protein tissue-specifically in a subject.

3. The method of claim 1, wherein the ER lumen targeting membrane protein has ER transmembrane domain.

4. The method of claim 1, wherein the biotin ligase is fused to the N-terminus or C-terminus of the ER lumen targeting membrane protein or inserted into the ER lumen targeting membrane protein.

5. The method of claim 1, wherein the fusion protein labels a secretory protein or peptide in the process of the secretory protein or peptide passing through the endoplasmic reticulum membrane.

6. The method of claim 1, wherein the cells are selected from the group consisting of cancer cells, kidney cells, skin cells, ovarian cells, synovial cells, peripheral blood mononuclear cells, fibroblasts, fibrous cells, nerve cells, epithelial cells, keratinocytes, hematopoietic cells, melanocytes, chondrocytes, macrophages, muscle cells, blood cells, bone marrow cells, lymphocyte cells, mononuclear cells, lung cells, pancreatic cells, liver cells, gastric cells, intestinal cells, cardiac cells, brain cells, bladder cells, urethral cells, embryonic germ cells, cumulus cells and a combination thereof.

7. The method of claim 1, wherein step (a) either
(i) delivers a recombinant virus expressing the fusion protein to a subject tissue-specifically, or
(ii) expresses the fusion protein by using a transgenic mouse expressing the fusion protein tissue-specifically by Cre-LoxP.

8. The method of claim 7, wherein the recombinant virus is any one selected from the group consisting of adenovirus, retrovirus, herpesvirus, lentivirus, herpesvirus and reovirus.

9. The method of claim 1, wherein the tissue is any one selected from the group consisting of brain, lung, liver, stomach, intestine, heart, kidney, skin, ovary, testis, nerve, muscle, bone marrow, bone, adrenal gland, pituitary, prostate, spleen, thyroid, uterus, adipose, artery, vein, pancreas and bladder.

10. The method of claim 1, wherein the biotinylated protein or peptide is obtained by adding Streptavidin beads, Neutravidin beads or anti-biotin beads.

11. The method of claim 1, wherein the sample is any one selected from the group consisting of cells, blood, urine and body fluid.

12. The method of claim 1, wherein the analysis is performed by using at least one method selected from the group consisting of mass spectrometry, western blot, fluorescence microscopy, dot blot and ELISA.

* * * * *